US011505408B2

(12) United States Patent
Garbagnati et al.

(10) Patent No.: US 11,505,408 B2
(45) Date of Patent: Nov. 22, 2022

(54) MODULE OF MODULAR CONVEYOR BELT WITH ROLLER TRANSPORT SURFACE AND MODULAR CONVEYOR BELT FORMED BY A PLURALITY OF SUCH MODULES

(71) Applicant: REGINA CATENE CALIBRATE S.P.A., Milan (IT)

(72) Inventors: Carlo Garbagnati, Castello di Brianza (IT); Norberto Cattaneo, Usmate Velate (IT)

(73) Assignee: REGINA CATENE CALIBRATE S.P.A., Milan (IT)

( * ) Notice: Subject to any disclaimer, the term of this patent is extended or adjusted under 35 U.S.C. 154(b) by 0 days.

(21) Appl. No.: 17/374,277

(22) Filed: Jul. 13, 2021

(65) Prior Publication Data
US 2022/0017307 A1    Jan. 20, 2022

(30) Foreign Application Priority Data

Jul. 14, 2020    (IT) .................. 102020000017068

(51) Int. Cl.
*B65G 17/08*    (2006.01)
*B65G 17/24*    (2006.01)
(Continued)

(52) U.S. Cl.
CPC ........... *B65G 17/083* (2013.01); *B65G 17/24* (2013.01); *B65G 17/40* (2013.01); *B65G 23/06* (2013.01);
(Continued)

(58) Field of Classification Search
CPC ...... B65G 17/083; B65G 17/24; B65G 17/40; B65G 39/20; B65G 2207/30; B65G 15/52;
(Continued)

(56) References Cited

U.S. PATENT DOCUMENTS 3,245,517 A    4/1966    Ward
3,674,130 A    7/1972    Carmichael
(Continued)

FOREIGN PATENT DOCUMENTS

EP    1842806 A1    10/2007
EP    3612474 A1    2/2020
(Continued)

OTHER PUBLICATIONS

Written Opinion dated Sep. 12, 2021 re: Application No. PCT/NL2021/050358, pp. 1-10, citing: US 2005/126896 A1, U.S. Pat. No. 3,674,130 A, EP 1 842 806 A1, EP 3 612 474 A1, WO 2010/124719 A1, U.S. Pat. No. 3,245,517 A and US 2011/0056807 A1.

*Primary Examiner* — Mark A Deuble
(74) *Attorney, Agent, or Firm* — Cantor Colburn LLP

(57) ABSTRACT

A modular conveyor belt module includes a base body extending along a first direction transverse with respect to the transport direction, between two opposite lateral faces. The module includes upper and lower surfaces; two opposed longitudinal edges; hinge elements projecting respectively from the two edges along a second direction. Each of the first and second hinge elements is crossed by a first and second hole, respectively, the axes of the holes being parallel to the first direction. The holes are each coaxial to each other. The first hinge elements interpose the second hinge elements of another module with the respective holes coaxially aligned. The hinge elements are interposed to each other leaving free spaces to receive a roller. Each roller projects with a portion from the upper surface, the plane parallel with respect to the two directions and tangent to the portion of the rollers projecting from the upper surface.

18 Claims, 15 Drawing Sheets

(51) Int. Cl.
*B65G 17/40* (2006.01)
*B65G 39/20* (2006.01)
*B65G 23/06* (2006.01)

(52) U.S. Cl.
CPC .......... *B65G 39/20* (2013.01); *B65G 2207/30* (2013.01)

(58) Field of Classification Search
CPC .......... B65G 2812/02376; B65G 23/04; B65G 23/06
See application file for complete search history.

(56) References Cited

U.S. PATENT DOCUMENTS

| | | | |
|---|---|---|---|
| 6,932,211 B2 | 8/2005 | Wieting et al. | |
| 7,073,659 B1 | 7/2006 | Lucchi | |
| 7,527,146 B2 | 5/2009 | Stebnicki et al. | |
| 7,850,001 B2 * | 12/2010 | Krisl | B65G 21/22 198/852 |
| 9,969,556 B2 * | 5/2018 | Andersen | B65G 17/40 |
| 10,065,802 B1 | 9/2018 | Chen | |
| 2005/0126896 A1 | 6/2005 | Wieting et al. | |
| 2007/0227861 A1 | 10/2007 | Stebnicki et al. | |
| 2011/0056807 A1 | 3/2011 | Fourney | |
| 2022/0169448 A1 * | 6/2022 | Garbagnati | B65G 17/32 |

FOREIGN PATENT DOCUMENTS

| | | |
|---|---|---|
| NL | 1010530 C2 | 5/2000 |
| WO | 2010124719 A1 | 11/2010 |
| WO | 2013030404 A1 | 3/2013 |
| WO | 2017055999 A2 | 4/2017 |
| WO | 2018194828 A1 | 10/2018 |
| WO | 2021246874 A1 | 12/2021 |

\* cited by examiner

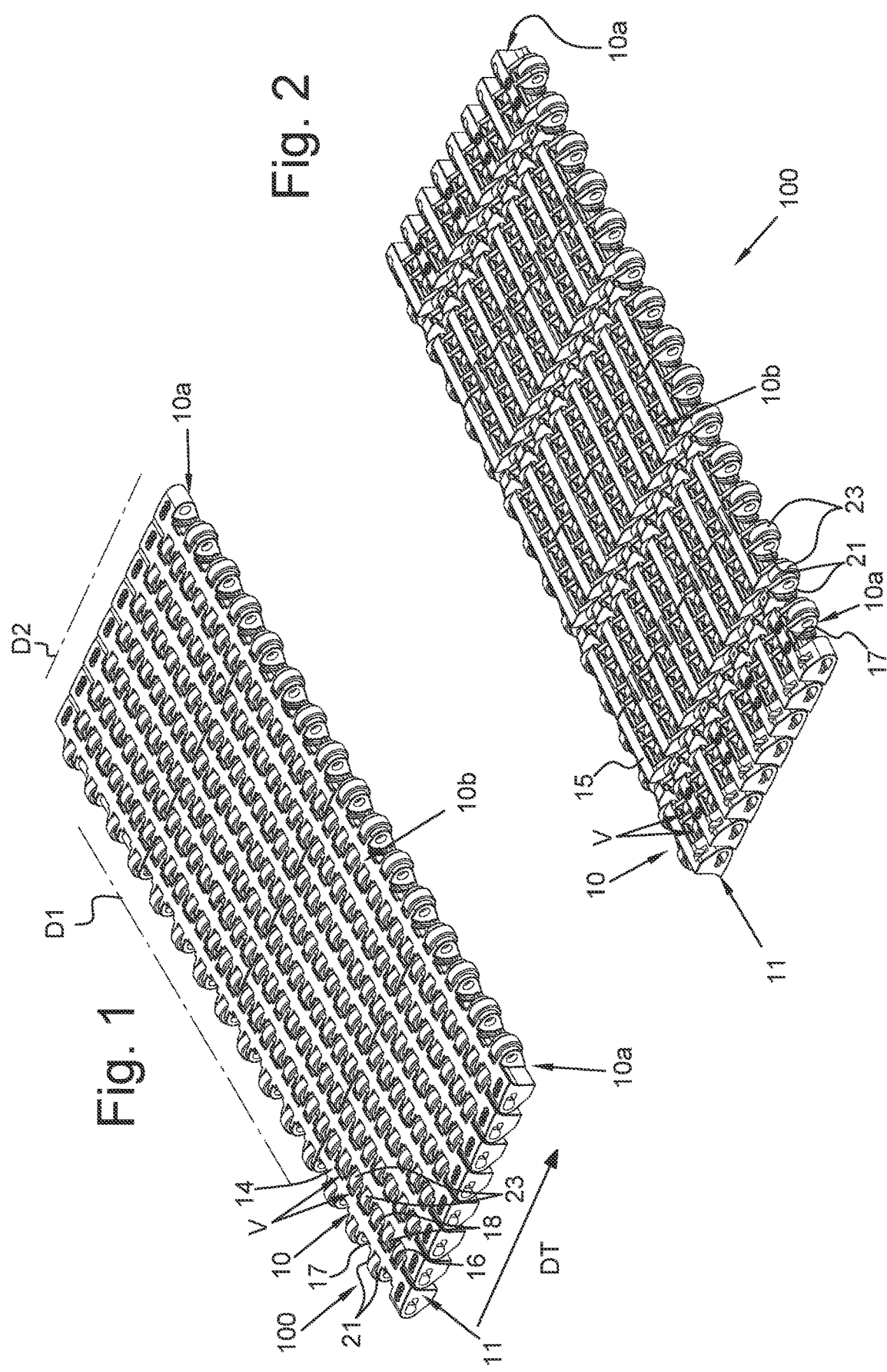

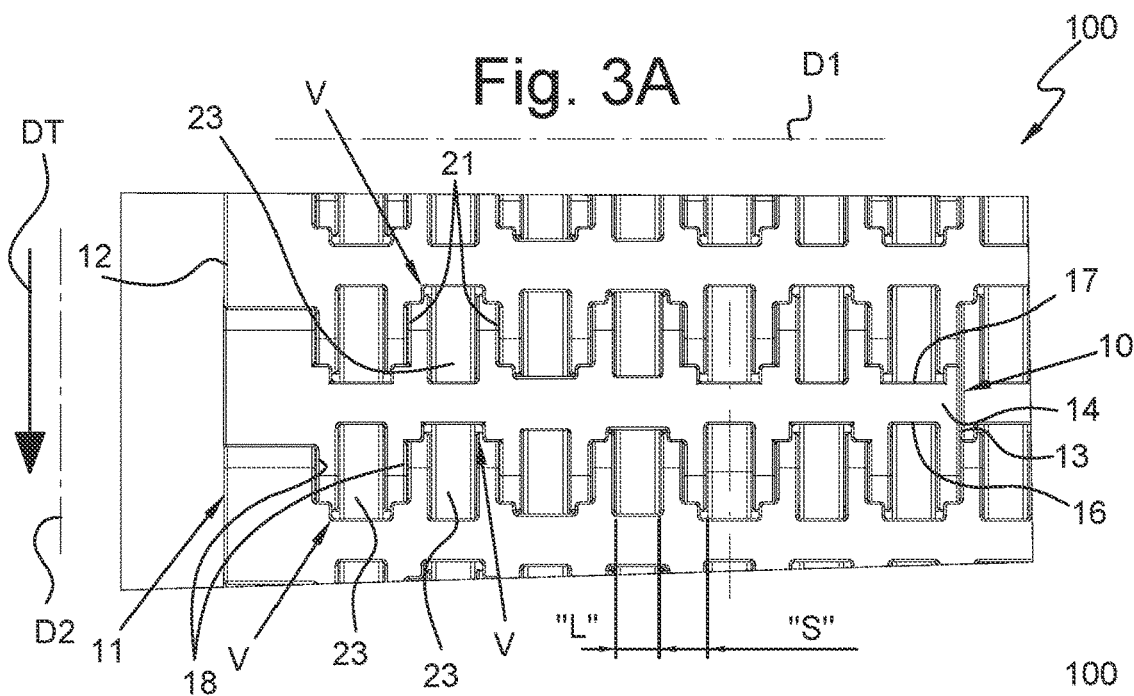
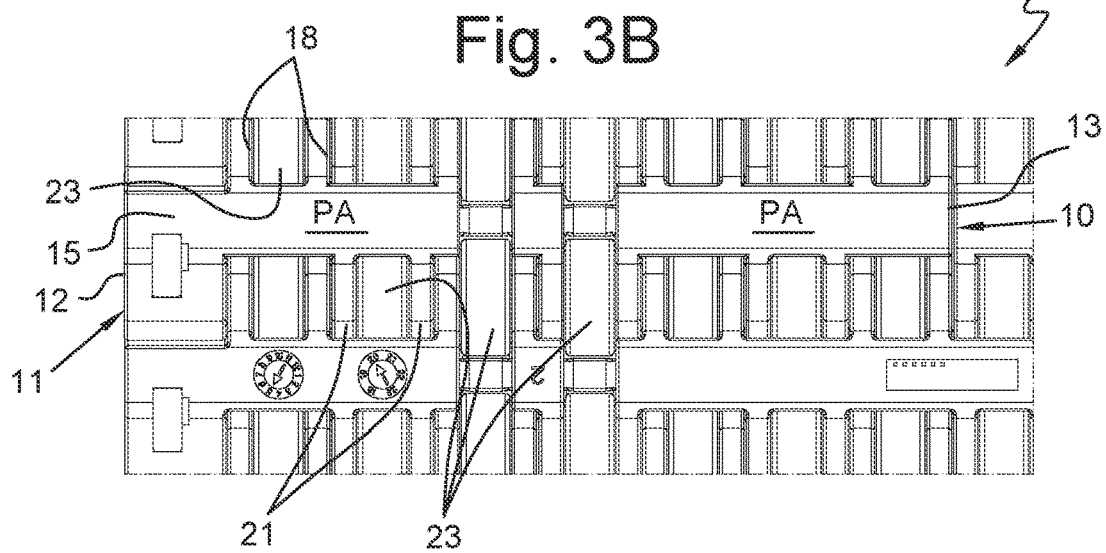
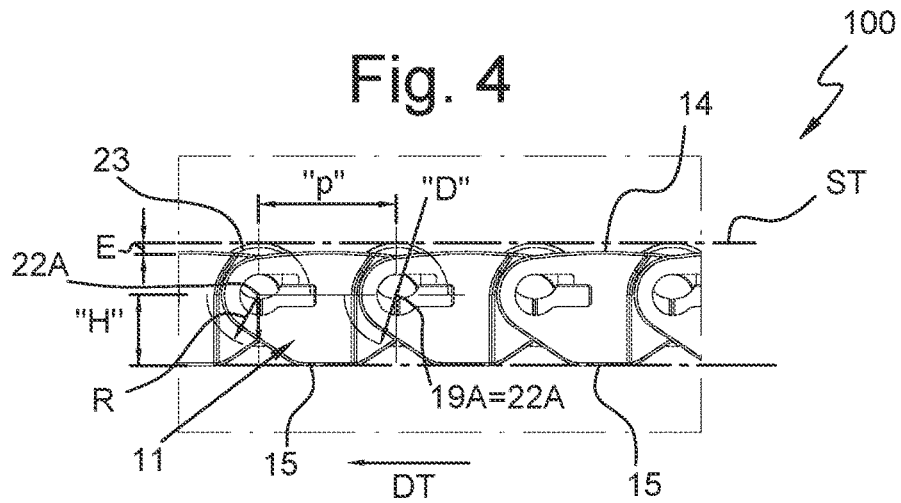

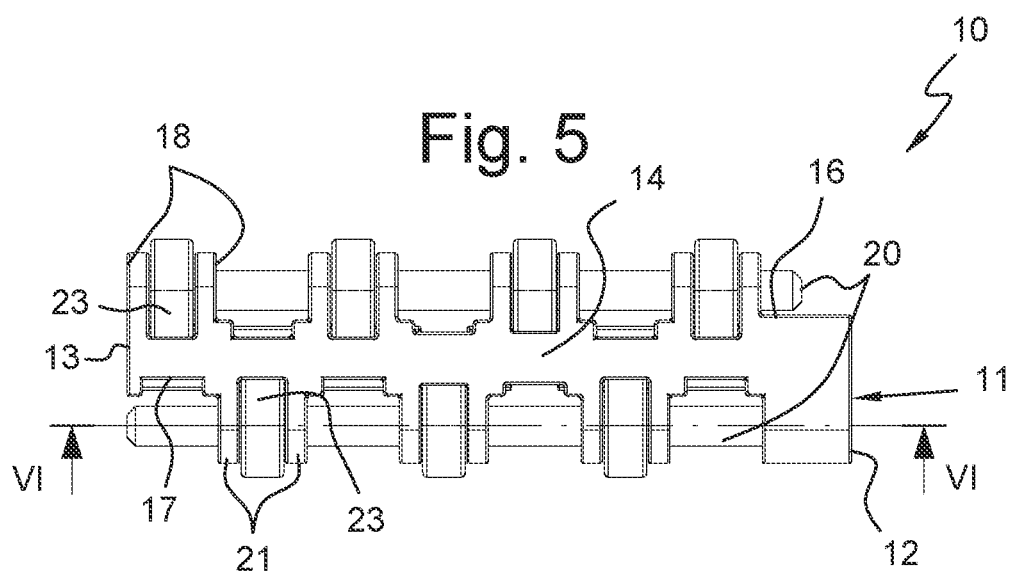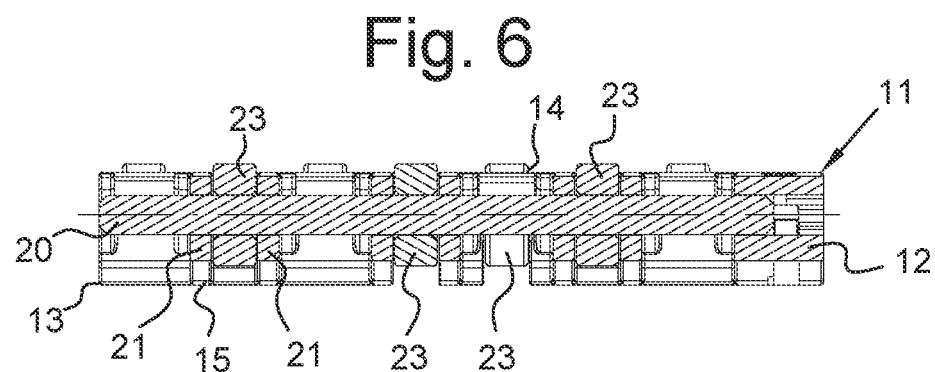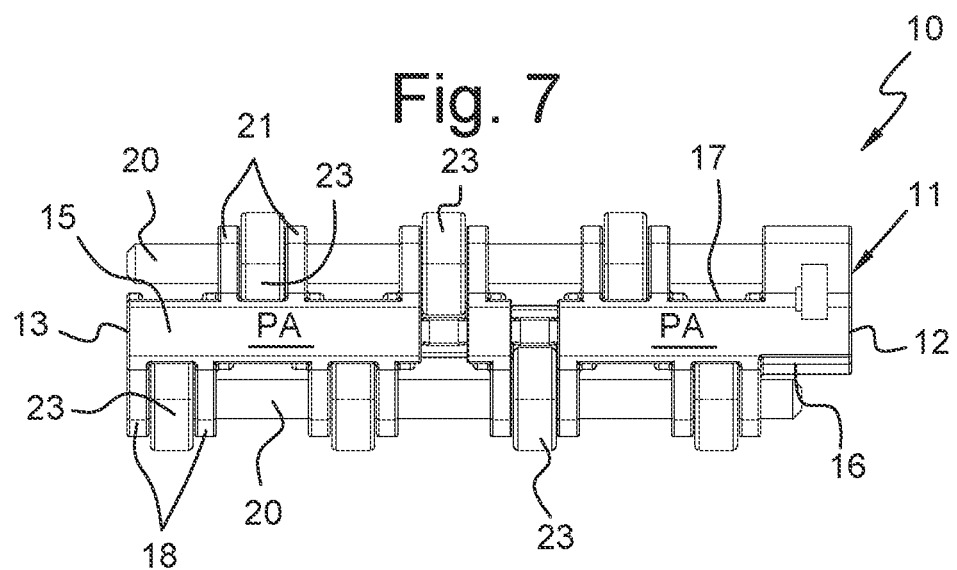

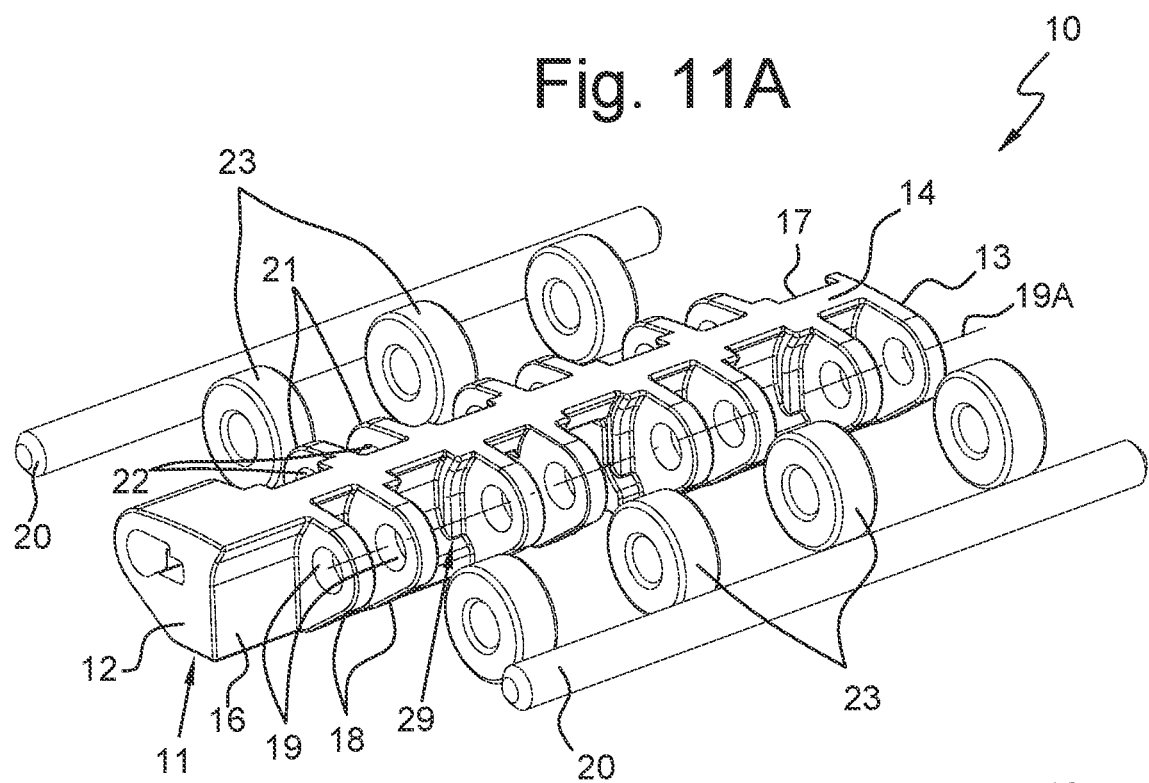
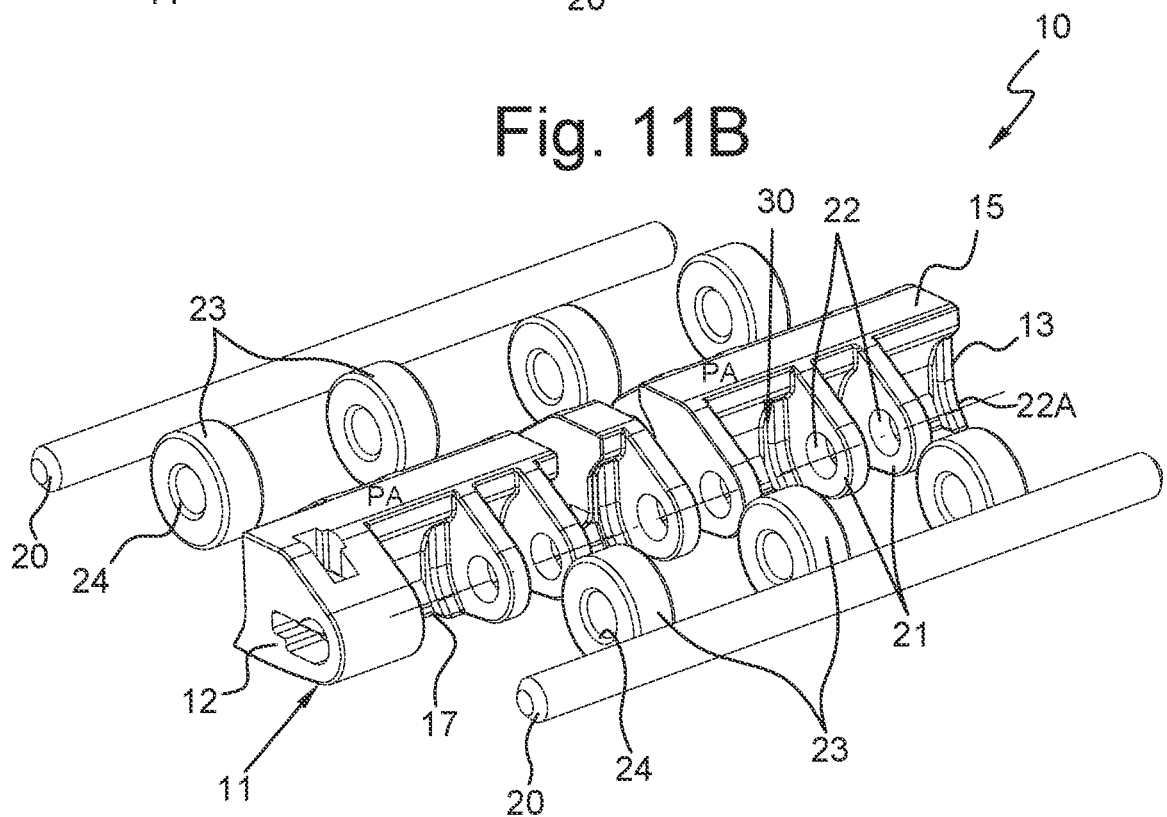

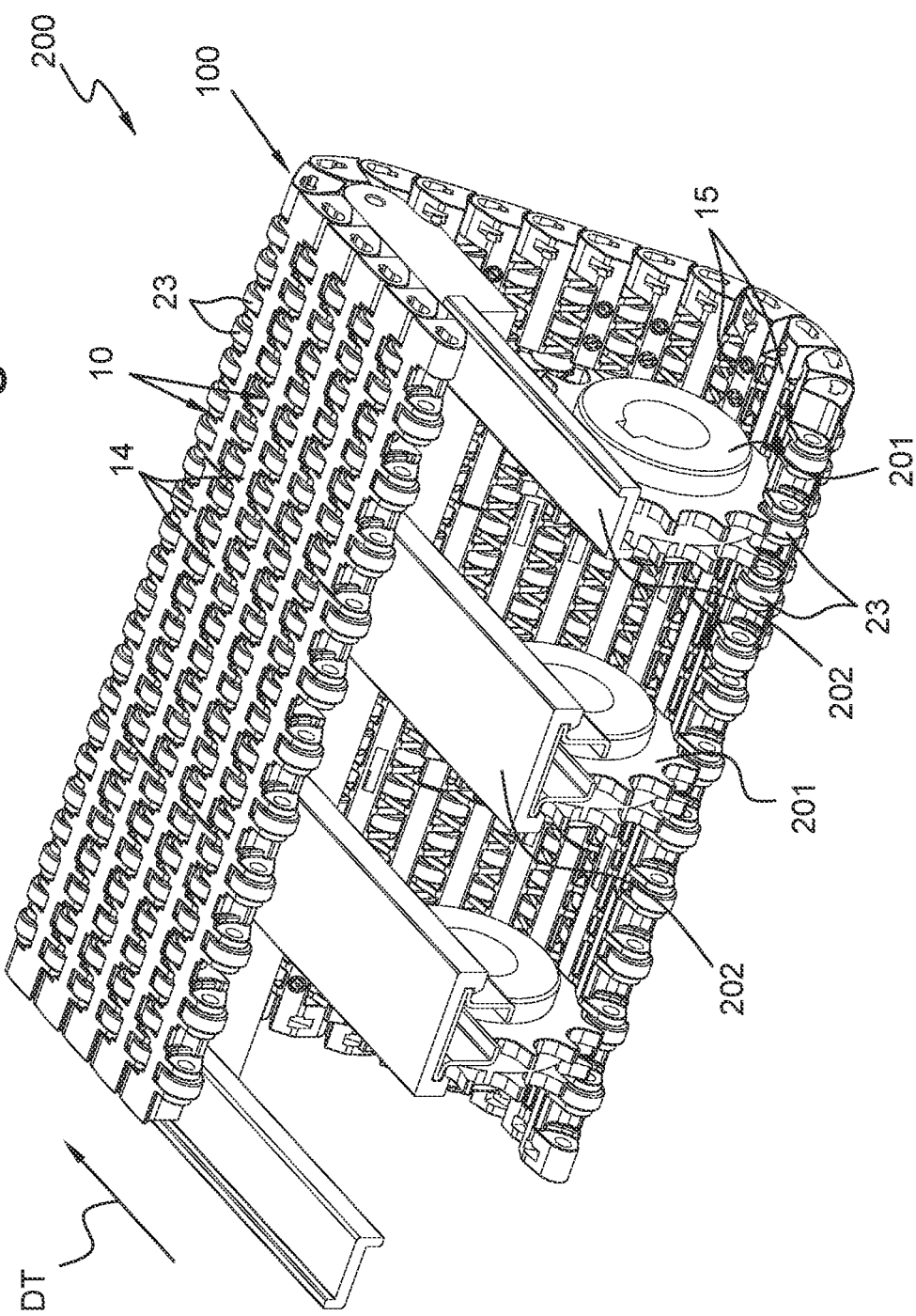

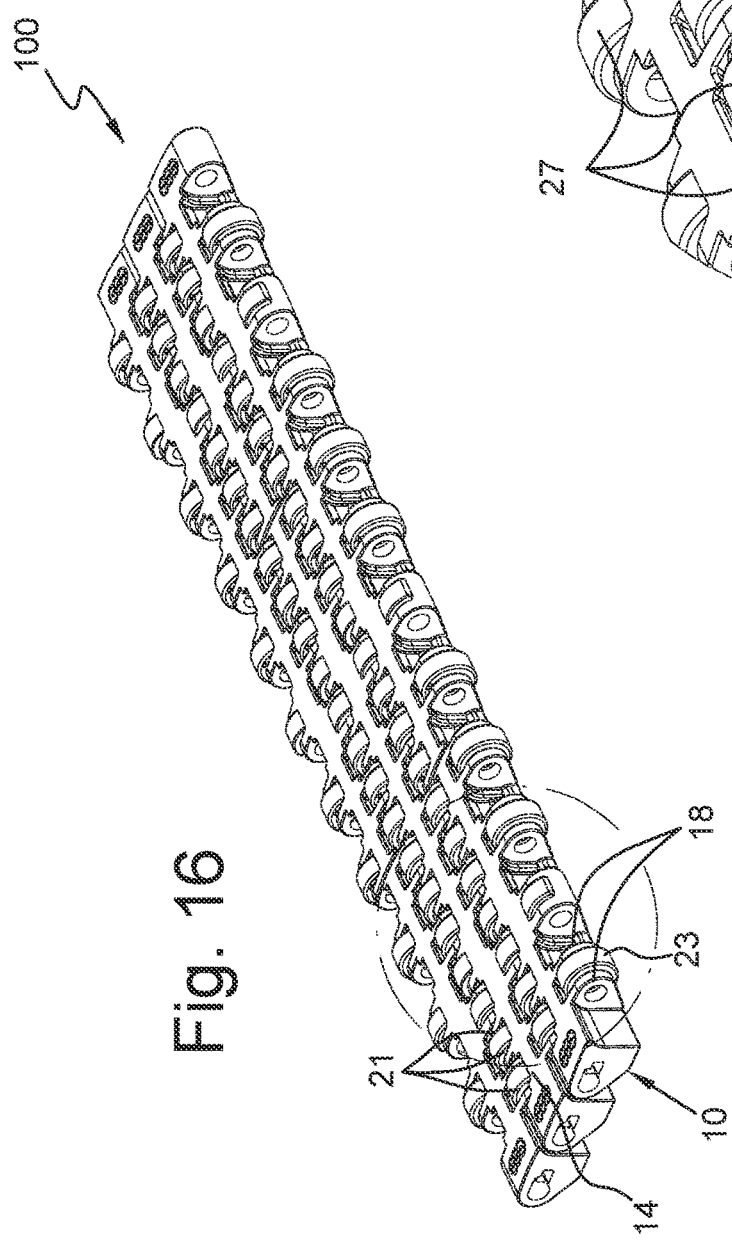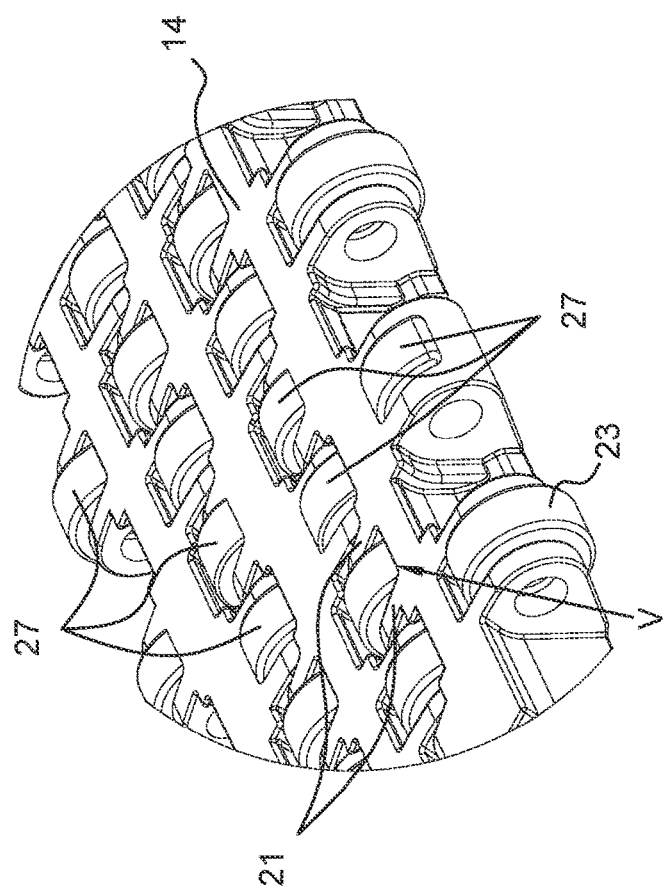

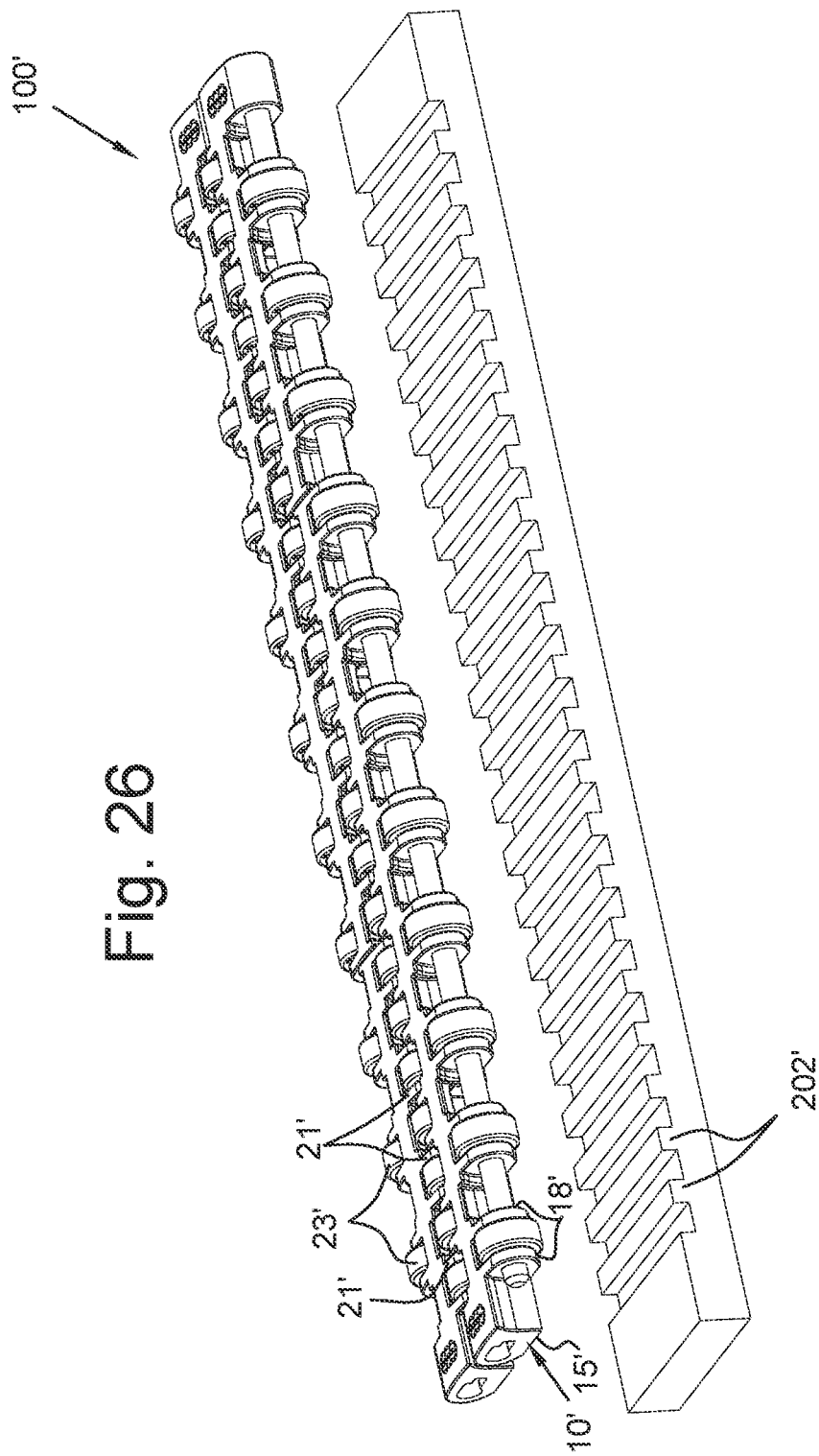

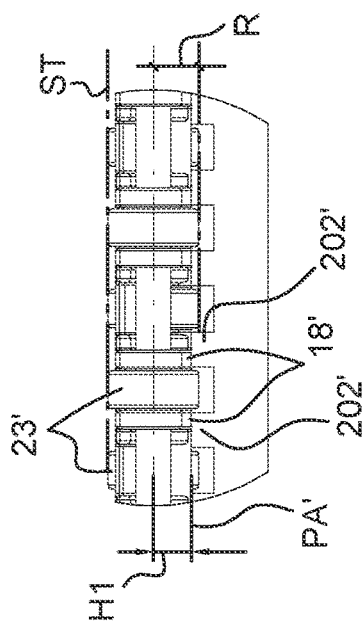
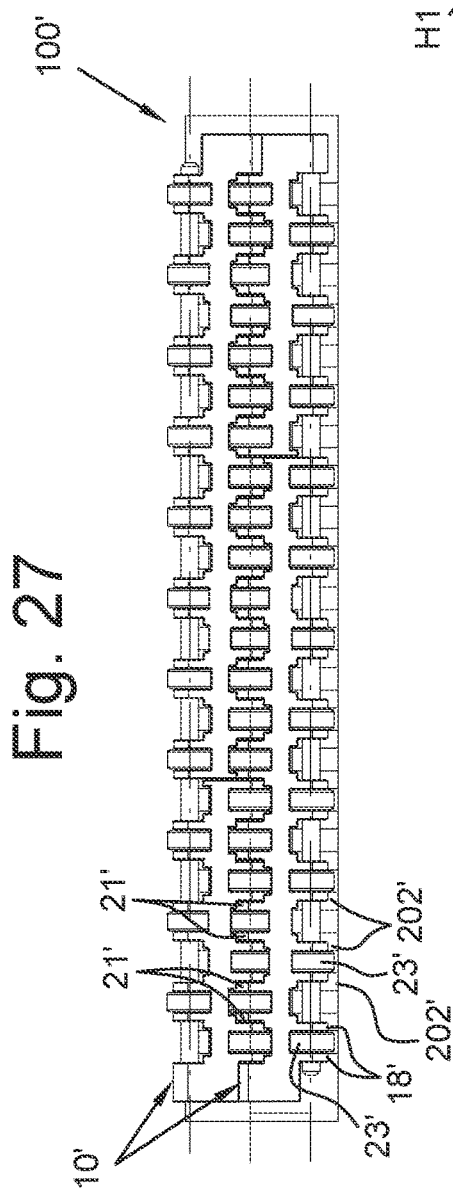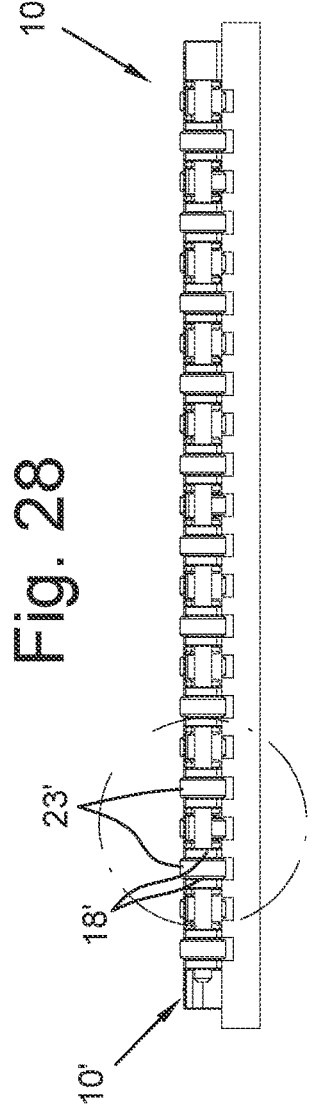

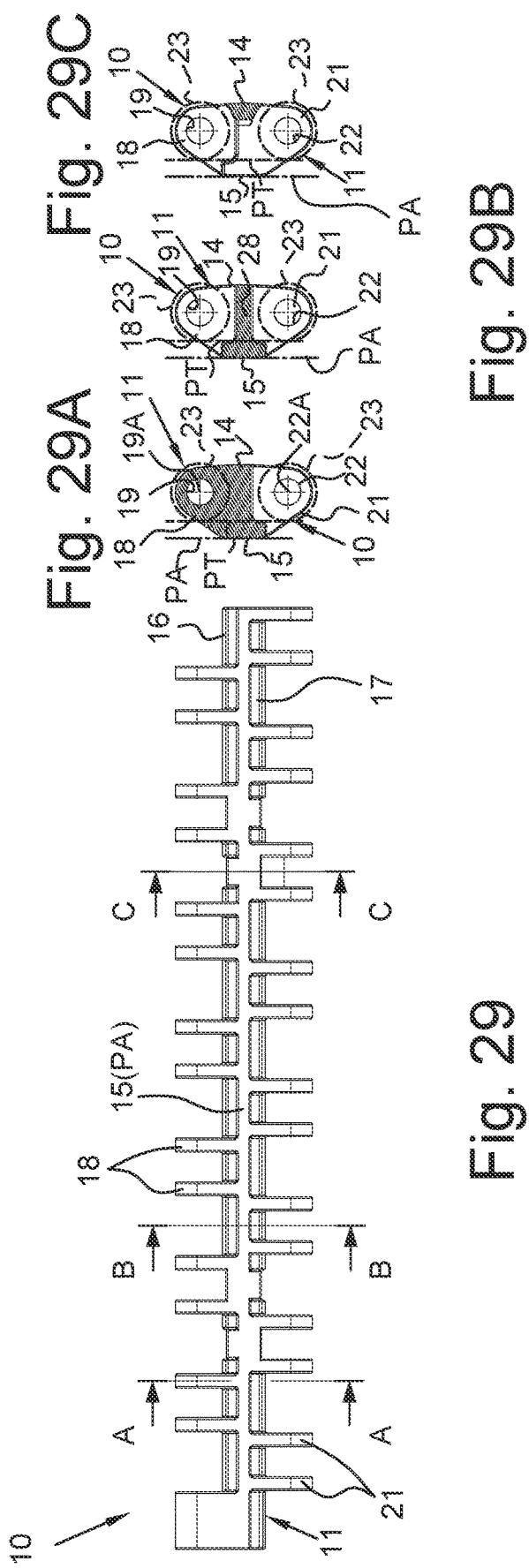

MODULE OF MODULAR CONVEYOR BELT WITH ROLLER TRANSPORT SURFACE AND MODULAR CONVEYOR BELT FORMED BY A PLURALITY OF SUCH MODULES

CROSS-REFERENCE TO RELATED APPLICATIONS

This application is related to and claims the benefit of Italian Patent Application No. 102020000017068, filed on Jul. 14, 2020, the contents of which are herein incorporated by reference in their entirety.

TECHNICAL FIELD

The present disclosure relates to a module of modular conveyor belt with roller transport surface, of the type with rollers mounted on hinge pins, for motorized continuous conveyors, and to a modular conveyor belt formed by a plurality of such modules.

BACKGROUND

In the field of conveyor belts, conveyor belts are known to be formed by a plurality of modules hinged to each other and whose transport surface is defined by a plurality of rollers associated with the modules.

In particular, modules are known to be constituted by a base body that, in correspondence of a front edge and a rear edge with respect to the transport direction of the belt, is provided with one or more eyelets or hinge elements which receive articulation pins with adjacent modules.

One or more recesses for coupling with the teeth of drive gears of the belt are formed in the base body; as known, these recesses are accessible from the lower surface of the base body, that is, from the surface opposite to that provided with rollers.

Two types of modules of modular conveyor belt with roller transport surface are known:
  A first type, in which supports of one or more shafts project from the upper surface of the base body, on each of which shaft there is mounted, in a rotatable manner, a plurality of rollers adjacent to each other to form a row extending substantially along the whole width of the module, less the thickness of the supports. The rollers are rotatably mounted on shafts that are distinct from the articulation pins. The transport surface of the belt is defined by the plane tangent to the external lateral surface of the rollers. Examples of such modules are described in documents NL1010530, WO2013030404 and WO2017055999A2.
  A second type, in which the rollers are incorporated in the thickness of the base body of the module, projecting above and below it, and are mounted coaxial to the hinge pin articulating successive modules. The rollers are rotatably mounted on the hinge pins articulating adjacent modules to each other and are arranged symmetrically with respect to the thickness of the base body. That is, the rollers project below the lower surface of the base body, which lower surface forms the support plane in sliding contact on the slider tracks of the conveyor. The transport surface of the belt is defined by the plane tangent to the external lateral surface of the portion of the rollers that projects above the base body of each module. Examples of such modules are described in U.S. Pat. Nos. 7,527,146 and 10,065,802.

Modules of the first type have the advantage of offering an almost continuous transport surface formed by the succession of rows of rollers. They also have a high mechanical resistance, sometimes excessive compared to the application requirements, a high extension of the support plane in contact with the slider tracks and, therefore, limited wear due to the sliding contact thereof on the slider tracks of the conveyor, and have a strong meshing with the drive gears.

However, these modules have the disadvantage of having large dimensions, particularly in height, and heavy weight, which penalises the conditions of use of the belts formed with them.

In particular, modules of this type have a high overall height which is given by the sum of the thickness of the base body, the diameter of the rollers and the clearance existing between the rollers and the upper surface of the module itself. As known to the person skilled in the art, the so-called "chordal effect" of opening and separation of the modules in correspondence of the winding of the belt around the drive gears is directly correlated to said total height. This "chordal effect" is undesirable, as it causes problems with the continuity of the transport surface in correspondence of the passages with so-called "dead passage plates" arranged at the ends of the belt, as well as problems of safety of use, as for example there is the possibility that operators may unintentionally injure themselves.

The overall weight of these modules also penalises the conditions of use of the conveyor belt, on the one hand limiting the transportable payload and on the other hand affecting the state of tensile stress that must be applied to the belt in order to drive it into motion.

The modules of the second type, on the other hand, have the advantage of having a lower overall height and weight than the modules of the first type. The lower height of these modules makes it possible to contain the opening zones between rollers of successive modules of the same belt during the winding step of the belt in correspondence of one end of the conveyor (head winding) and the head passages between two successive conveyors, with consequent advantages in terms of greater safety and more regularity in the transport of the products when passing between two successive conveyors.

However, the modules of the second known type also have certain drawbacks.

A first drawback consists in the fact that the rollers are inevitably spaced apart from each other, so that it is impossible to obtain an almost continuous transport surface with consequent problems of stability of the transported products.

The spacing of the rollers is due, on the one hand, to the impossibility of arranging the rollers in correspondence of the portions of the base body in which the recesses for the coupling with the teeth of the transmission gears are obtained and/or in which the support plane in sliding contact with the slider tracks is defined. As the rollers project below the support plane of the base body, it is impossible to arrange the slider tracks in correspondence of the rollers: in fact, an acceleration of the products would be generated due to the rolling of the rollers on the slider tracks. The belts to which reference is made (so-called LBP Low Back Pressure) are, on the other hand, used to transport the products in correspondence of the end of the line (for example in correspondence of the passage of the products between a shrinkwrapper and a palletizer) creating at the same time zones or buffers of accumulation of the products, without the products being subjected to accelerations. On the other hand, the spacing of the rollers is due to the need not to excessively reduce the mechanical strength of the modules.

A further disadvantage consists in the fact that these modules have lower mechanical characteristics than corresponding modules without rollers or with rollers supported above their respective base bodies, the resistant cross-section of them being reduced by the containment seats of the rollers themselves.

They are also subject to high wear due to the limited extension of the support plane of the base body in sliding contact with the slider tracks. The position and dimensions, particularly in width, of the slider tracks is limited and constrained by the presence of the rollers; the slider tracks can only be arranged in correspondence of the portions of the base body without rollers.

This is clearly illustrated by documents U.S. Pat. Nos. 7,527,146 and 10,065,802. As can also be seen from the drawings of U.S. Pat. No. 7,527,146 alone, the support plane of the base body of each module is limited to the hinge elements devoid of rollers.

According to what is described and illustrated in U.S. Pat. No. 10,065,802, zones of the base body are provided which are deliberately devoid of rollers, in correspondence of which the recesses for the meshing with the teeth of the transmission gears and the support plane for contact with the slider tracks are obtained. The position and width of the slider tracks are therefore bound to these zones.

SUMMARY

The present disclosure is, therefore, realizes a module of modular conveyor belt with roller transport surface for continuous motorized conveyors of the type with rollers mounted on hinge pins and a modular conveyor belt formed by a plurality of such modules which overcome the drawbacks of the prior art.

Within this general scope, the present disclosure proposes a module which enables the advantages of the known modules of the first type to be incorporated in modules of the second type.

The present disclosure further realizes a module which allows to obtain conveyor belts having a substantially continuous roller transport surface by increasing the density of the rollers.

The present disclosure also realizes a module which enables the simple realisation of meshing elements with the teeth of the drive gears of the conveyor, ensuring the stable and safe coupling thereof.

The present disclosure also provides a module which allows to increase the extension of the support plane in sliding contact with the slider tracks of the conveyor and which allows a wide freedom of choice of the position and dimensions of the slider tracks.

The present disclosure further provides a module for modular conveyor belt with roller transport surface and a modular conveyor belt formed by a plurality of said modules which are particularly simple and functional, at a low cost.

These advantages according to the present disclosure are achieved by providing a module of modular conveyor belt with roller transport surface, of the type with rollers mounted on the hinge pins, and a modular conveyor belt as set forth in the independent claims.

Further features are comprised in the dependent claims.

BRIEF DESCRIPTION OF THE DRAWINGS

The features and advantages of a module of modular conveyor belt with roller transport surface, of the type with rollers mounted on hinge pins, and of a modular conveyor belt formed by a plurality of modules according to the present disclosure will be more apparent from the following description, which is to be understood as exemplifying and not limiting, with reference to the appended schematic drawings, wherein:

FIGS. 1 and 2 are axonometric views of a portion of a modular conveyor belt from above and below, respectively, according to a first possible embodiment of the present disclosure;

FIGS. 3A, 3B and 4 are top plan, bottom plan and side elevation views respectively of a tract of the belt of FIGS. 1 and 2;

FIG. 5 is a top plan view of a head module of the belt of FIGS. 1 and 2 complete with rollers and hinge pins;

FIG. 6 is a section according to plane VI-VI of FIG. 5;

FIG. 7 is the bottom plan view of the module in FIG. 5;

FIGS. 11A and 11B are axonometric and exploded views respectively from above and from below of the module of FIG. 5;

FIG. 12 is an axonometric view of a portion of a continuous motorized conveyor comprising a modular conveyor belt according to a first possible embodiment of the present disclosure;

FIG. 16 is an axonometric view from above of a portion of a modular conveyor belt according to a second possible embodiment of the present disclosure;

FIG. 16A is an enlargement of a detail of FIG. 16;

FIG. 26 is an axonometric view from above and partially exploded of a portion of a continuous motorized conveyor comprising a modular conveyor belt according to an alternative embodiment of the present disclosure and the relative slider tracks;

FIGS. 27 and 28 are top and front plan views respectively of the conveyor portion of FIG. 26 with the belt resting on the slider tracks;

FIG. 28A shows a detail of FIG. 28 in an enlarged scale;

FIG. 29 a bottom plan view of a further embodiment of the module according to the present disclosure; and FIGS. 29A, 29B, 29C are sections according to the planes AA, BB and CC of FIG. 29 respectively.

DETAILED DESCRIPTION OF THE DRAWINGS

Figure 10:
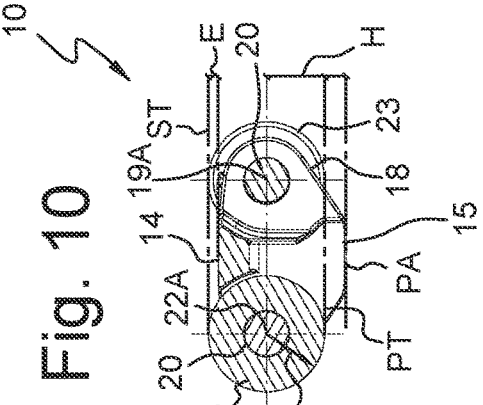
FIGS. 9 and 10 are section views according to the planes IX-IX and X-X of FIG. 8, respectively.
Figure 8:
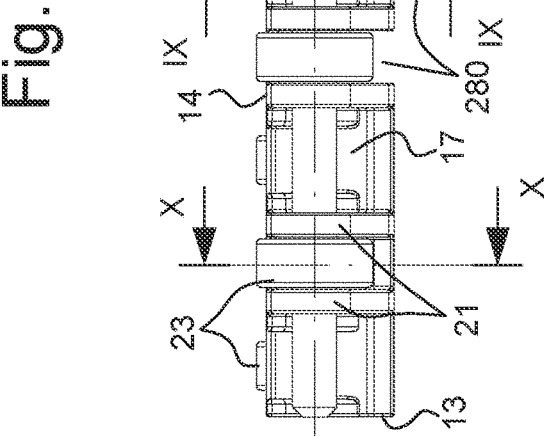
FIG. 8 is a front view of the module of FIG. 5.
Figure 9:
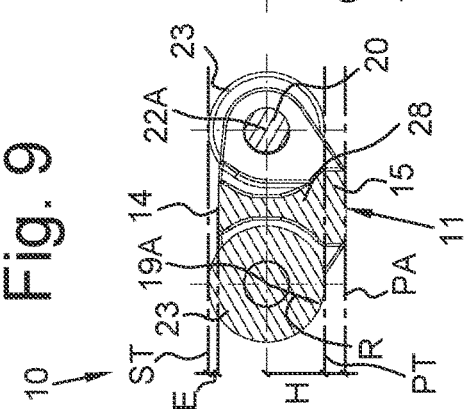

With reference to the attached figures, a module of modular conveyor belt of the type with roller transport surface is indicated by 10, by 100 a modular conveyor belt constituted by a plurality of modules 10 placed side by side in successive rows and wherein the modules 10 of adjacent rows are linked to each other to form a closed loop, and by 200 a continuous motorized conveyor comprising such a belt 100.

It should be noted that in the present description adjectives such as "first" and "second" are for the sole purpose of clarity of exposition and should in no way be understood in a limiting sense. Equal numbers are used to designate corresponding elements.

Furthermore, in the present description, adjectives such as "front" and "rear", "upper" and "lower" refer to the usual conditions of use of the module 10 to form a closed-loop belt 100 driven into motion by a pair of gears and forming an upper branch for transporting products and a lower return branch.

The module 10 is used to realise belts 100 which, for example, are used to transport bottles, cans or cartons individually or in groups.

The belts 100 to which the present disclosure refers are so-called LBP (Low Back Pressure).

Such belts 100 are used, for example, to transport products and, at the same time, to realise so-called buffers or accumulation zones for the products along the transport lines leading them through successive stations of a processing and/or packaging plant. For example, such belts 100 are used to realise buffers or accumulation zones along the transport line between a packaging station and a palletising station.

Reference will first be made to the first embodiment shown in FIGS. 1 to 15, of which FIGS. 5 to 11B show an end module 10, i.e. used at the end of each row of modules forming the belt 100. As can be immediately understood by the person skilled in the art, the features of the module 10 described with reference to the end module 10 are equally found in end modules 10a with different length extensions and in intermediate modules 10b as clearly shown for example in FIGS. 1 and 2. The module 10 comprises a base body 11 extending in length along a first direction D1 between two opposed lateral faces 12 and 13.

The first direction D1 is transverse, in particular orthogonal, with respect to the transport direction of the belt 100 as shown by the arrow DT.

The base body 11 comprises:
an upper surface 14 and a lower surface 15,
a first longitudinal edge 16 and a second longitudinal edge 17, opposed to each other with respect to a second direction D2 orthogonal with respect to said first direction D1.

The second direction D2 is parallel to the transport direction DT.

The first longitudinal edge 16 and the second longitudinal edge 17 develop along the first direction D1 along the length of the base body 11 and, considering also the direction of advancement of the belt 100, one of them (in the figures the first longitudinal edge 16) is front and the other one is rear (in the figures the second longitudinal edge 17).

The base body 11 further comprises:
a plurality of first hinge elements 18 projecting from the first longitudinal edge 16 along the second direction D2 and each of which is crossed by a respective first hole 19 with axis 19A parallel to the first direction D1, the first holes 19 being coaxial to each other to receive a hinge pin 20;
a plurality of second hinge elements 21 projecting from the second longitudinal edge 17 along the second direction D2 and each of which is crossed by a respective second hole 22 with axis 22A parallel to the first direction D1, the second holes 22 being coaxial to each other to receive a hinge pin 20.

The first hinge elements 18 of each module 10 are suitable for interposing the second hinge elements 21 of another said module 10 adjacent thereto (in the figures, the immediately preceding module 10) along the transport direction DT in such a way that the respective first holes 19 and second holes 22 are coaxially aligned each other to receive a common hinge pin 20 linking said two adjacent modules 10 that follow each other along the transport direction DT. Between the first hinge elements 18 of each module 10 and the second hinge elements 21 of the module 10 adjacent thereto, a plurality of spaces V interposed between them remains free, in at least some of which spaces V at least one respective roller 23 coaxial to the first holes 19 and to the second holes 22 aligned to each other is received.

Each roller 23 has an outer radius R and is suitable to be rotatably mounted on the hinge pin 20 which links two adjacent modules 10.

Each roller 23 is crossed by an axial hole 24 suitable to receive the hinge pin 20.

Each roller 23 has a height L essentially equal to the width of the respective space V, except for the necessary coupling clearances which must enable the free rotation of the rollers 23. If several rollers 23 are received in the same space V, the total height of the rollers is substantially equal to the width of the space V. For example, each roller 23 has a height of about 5 mm and the space V has a width of about 5.4 mm. In the present application, therefore, "L" will denote both the height of each roller 23 or the total height of the rollers 23 received in each space V, and the width of each space V, the values of which in practice differ by a few tenths of a millimetre, generally less than 0.5 mm.

Each roller 23 projects with a portion above the upper surface 14 by an amount E that is different from zero. The plane parallel to the first direction D1 and to the second direction D2 and tangent to the portion of the rollers 23 which projects above the upper surface 14 defines the transport surface ST of the products (FIG. 4). In practice, as is known, the products rest directly on the rollers 23.

The amount E may vary between 0.5 mm and 2.5 mm and is preferably 1 mm.

The module 10 further comprises at least a meshing element suitable to mesh with the teeth of drive gears 201 of the conveyor 200.

According to the present disclosure, the lower surface 15 of the base body 11 of each module 10 extends for at least a tract along a plane which is parallel with respect to said transport surface ST and which is spaced from the plane passing through the axes 19A, 22A of the first holes 19 and of the second holes 22A by a distance H higher than the radius R of the rollers 23, forming a support plane PA suitable to rest in sliding contact along slider tracks 202 of the conveyor 200. The distance H, as is evident from the attached figures, is measured between the support plane PA and the plane passing through the axes 19A, 22A of the first and second holes 19, 22, along the direction orthogonal thereto.

That is, the support plane PA is at a lower level than the plane PT tangent to the lower generatrix of each roller 23, the lower generatrix being the one diametrically opposed to that in correspondence of which the plane defining the transport surface ST is tangent. The support plane PA is at a distance from the transport surface ST greater than the distance that the plane PT tangent to the lower generatrix of the rollers 23 has with respect to the same transport surface ST, wherein this latter distance is equal to the outer diameter of the rollers 23 (D=2R) as is evident from FIGS. 9 and 10.

The support plane PA extends substantially continuously along the whole length of the base body 11, being interrupted only in correspondence of the meshing elements.

In this way, the slider tracks 202 can be freely arranged in any position along the width of the belt 100, regardless of whether or not the rollers 23 are present and of their position. In other words, the arrangement and the number of the rollers 23 is not bound to the number and dimensions of the slider tracks 202. The rollers 23 may be arranged along the whole length of the base body 11 (belt width), also in correspondence of the longitudinal tracts of the base body 11 which are in sliding contact with the slider tracks 202, no undesirable contact being generated between the latter and the rollers 23 and which would cause unwanted acceleration of the conveyed products. It is therefore possible to increase the "rolled" surface (i.e. provided with rollers), i.e. the density of the rollers 23, so as to obtain a substantially continuous transport surface ST with discontinuity zones of limited width (measured along the first direction D1) and, advantageously, less than or equal to 20 mm. This allows products of various sizes to be transported safely and stably.

In addition, the greater extension of the support plane PA allows for an increase in the surface in contact with the slider tracks 202 with a consequent reduction in the wear of the belt 100. That is, it is possible to adopt slider tracks 202 with increased width.

Preferably, the difference between the distance H and the radius R is different from zero and lower than or equal to 5 mm: $0\ mm<(H-R)\leq 5\ mm$.

For example, this height difference $(H-R)$ can be between 2 mm and 2.5 mm.

This height difference $(H-R)$ represents the limit thickness of wear.

It can be noted that the overall height of the module 10 is still limited in the order of 15 mm; for example, with rollers 23 with outer diameter D=12 mm (D=2R), maximum thickness of the base body 11 equal to 13.20 mm and difference between the distance H and the outer radius of the rollers R equal to 2.2 mm, the overall height of the module 10 is 14.20 mm.

According to a further aspect of the present disclosure, at least some of the rollers 23 constitute the meshing elements with the gears 201. It is specified that this feature may also be adopted independently of the feature according to which the support plane PA is at a lower level than the plane tangent to the lower generatrix of each roller 23. In particular, as will become clear in the following, it can also be adopted in modules in which the support plane PA is at a higher level than the plane tangent to the lower generatrix of each roller 23, such as for example represented in FIGS. 26-28.

The use of the rollers 23 defining the transport surface ST as meshing elements with the drive gears 201 of the conveyor also makes it possible to equally increase the "rolled" surface, i.e. the density of the rollers 23, so as to obtain a substantially continuous transport surface ST with discontinuity zones of limited width (measured along the first direction D1) and, advantageously, less than or equal to 20 mm. It is in fact possible to arrange the rollers 23 in positions corresponding to those of the transmission gears 201. This allows products of various sizes to be transported safely and stably.

In addition, the use of rollers 23 as meshing elements makes it possible to increase the number of such meshing elements without penalising the extent of the rolled surface. This makes it possible to use drive gears 201 even with several tooth crowns.

In possible alternative embodiments, such as for example shown in FIGS. 16-20 and 21-25, the meshing elements are not constituted by the rollers 23, but by recesses 25 obtained at least partially in the lower surface 15 outside the support plane PA (FIGS. 16-20) or by meshing teeth 26 (FIGS. 21-25) which extend downwardly from the lower surface 15 and outside the support plane PA.

In the first case, the spaces V in correspondence with the meshing elements are replaced or occupied by respective fixed supports 27. In the second case, the spaces V in correspondence with the meshing elements may be possibly replaced or occupied by respective fixed supports 27.

In a preferred embodiment, each of said fixed supports 27 is shaped such that it has an external lateral surface that projects above the upper surface 14 and that is tangent to the transport surface ST so as to ensure a substantial continuity of the transport surface. For example, the external lateral surface of each fixed support 27 may be a cylindrical sector with a radius equal to the radius R of the rollers 23 and an axis coaxial to the axes 19A, 22A. Each fixed support 27 i.e. reproduces a corresponding roller 23. Each fixed support 27 is advantageously obtained in a single piece with the base body 11.

Being said S the distance between two spaces V adjacent to each other measured along the first direction D1, according to the present disclosure this distance S is different from zero and lower than or equal to 20 mm ($0\ mm<S\leq 20\ mm$), preferably between 3 mm and 12 mm ($3\ mm\leq S\leq 12\ mm$). It is specified that this condition also applies if certain spaces V are replaced by respective fixed supports 27. By arranging a respective roller 23 in each space V, the distance S is defined between two adjacent product support elements, whether they are constituted by rollers 23 or fixed supports 27.

By arranging a respective roller 23 in each space V, except possibly in the spaces V in correspondence of which meshing elements other than the rollers 23 are obtained, it is possible to obtain a high density of the rollers 23 and therefore a substantially continuous roller transport surface ST with discontinuity zones with limited maximum width (measured along the first direction D1) and equal precisely to the distance S, advantageously, less than or equal to 20 mm.

In a preferred embodiment, this distance S between two spaces V or, in any case, between two adjacent support elements (rollers 23 and/or fixed supports 27) is between 3 mm and 6 mm ($3\ mm\leq S\leq 6\ mm$).

As mentioned above, this feature (i.e. $0\ mm<S\leq 20\ mm$) may be adopted with modules 10 in which the support plane PA is at a lower level than the plane tangent to the lower generatrix of each roller 23 as described above. However, as will become clearer in the following, it may also be adopted with different modules in which, in particular, the support plane PA is at a higher level than the plane tangent to the lower generatrix of each roller such as, for example, represented in FIGS. 26-28.

By indicating with P the pitch of each module 10, i.e. the spacing between the axes 19a and 22A of the respective first holes 19 and second holes 22, advantageously the ratio between the pitch P and the diameter D, i.e. the outer diameter, of each roller 23 is between 1.1 and 3:

$$1.1\leq P/D\leq 3$$

With D=2R.

In a preferred embodiment, the pitch P is about 15 mm (15.875 mm equal to ⅝") and the diameter D is 12 mm, with P/D equal to 1.32. In this case, the diameter of the hinge pin 20 is preferably equal to 4.6 mm.

The smaller the ratio P/D, the smaller the discontinuity of the rollers 23 in the transport direction DT.

Furthermore, defined as "transversal pitch" the sum of the distance S between two adjacent spaces V or, in any case, between two adjacent support elements (rollers 23 and/or fixed supports 27) and of the width L of each of said spaces V or of the height of the roller 23 (i.e. the overall height of the roller(s)) received in each space V or of the fixed support 27 occupying/replacing certain spaces V, it results that the ratio between the sum of all these distances S and the sum of the transverse pitches (L+S) measured along the first direction D1 is between 0.10 and 0.90:

$$0.10 \leq \frac{\sum_{1}^{n} \Sigma_{1}^{n} Si}{\sum_{1}^{n} (Li + Si)} \leq 0.90$$

Where:
n=number of the rollers
L=height of the roller(s) housed in each space V.
S=distance between two spaces V or in any case between two adjacent support elements (rollers 23 and/or fixed supports 27).

In a preferred embodiment this ratio varies between 0.40 and 0.60.

For example, with S=5.6 mm and L=5 mm for any value of the index i, it results that the ratio is about 0.52.

The smaller this ratio, the greater the transverse "rolled" surface with the same spacing "S" between the rollers.

In more detail, the base body 11 comprises a central rib 28 extending in length between the opposed lateral faces 12, 13 and in thickness between the upper surface 14 and the lower surface 15. This central rib 28 then has a first longitudinal surface and a second longitudinal surface connecting the upper surface 14 and the lower surface 15 and defining respectively the first longitudinal edge 16 and the second longitudinal edge 17.

The support plane PA extends substantially continuously along the lower surface 15 for the whole length of the central rib 28, being only interrupted in correspondence of the meshing elements. In correspondence of the meshing elements, as can be immediately understood, the central rib 28 may have openings 280 for meshing the teeth of the drive gears 201.

The first hinge elements 18 are distributed in pairs that are spaced one from the other along the first longitudinal edge 16, wherein the first hinge elements 18 of each pair are spaced to each other to define a respective space V. A respective first space 29 remains defined between two adjacent pairs of first hinge elements 18 or between a head end of the base body 11 and the pair of first hinge elements 18 adjacent thereto.

The second hinge elements 21 are distributed in pairs that are spaced one from the other along the second longitudinal edge 17, the second hinge elements 21 of each pair being spaced to each other to define a respective space V. A respective second space 30 remains defined between two adjacent pairs of second hinge elements 21 or between a head end of the base body 11 and the pair of second hinge elements 21 adjacent thereto.

The pairs of first hinge elements 18 are offset with respect to the pairs of second hinge elements 21, such that each pair of first hinge elements 18 of a module 10 is interposed between two successive pairs of second hinge elements 21 of a module 10 adjacent thereto or between a head end of the adjacent module 10 and the pair of second hinge elements 21 adjacent thereto by inserting into the respective second space 30, and vice versa.

In a preferred, but not limiting, embodiment, the pairs of first hinge elements 18 and of second hinge elements 21 are uniformly distributed along the whole length of the base body 11.

In the embodiment shown in FIGS. 1 to 15 a respective roller 23 of height L substantially equal to the width of the respective space V is received in each space V, and at least one pair of adjacent rollers 23 constitute meshing elements.

In this first embodiment (FIGS. 1 to 15), the combination of the feature whereby the support plane PA is arranged at a lower level than the plane tangent to the lower generatrix of each roller 23 and of the feature according to which the same rollers 23 are used as meshing elements allows not only to maximise the density of the rollers 23, but to be able to arrange the slider tracks 202 in any position and to be able to increase their width.

Figure 13A:
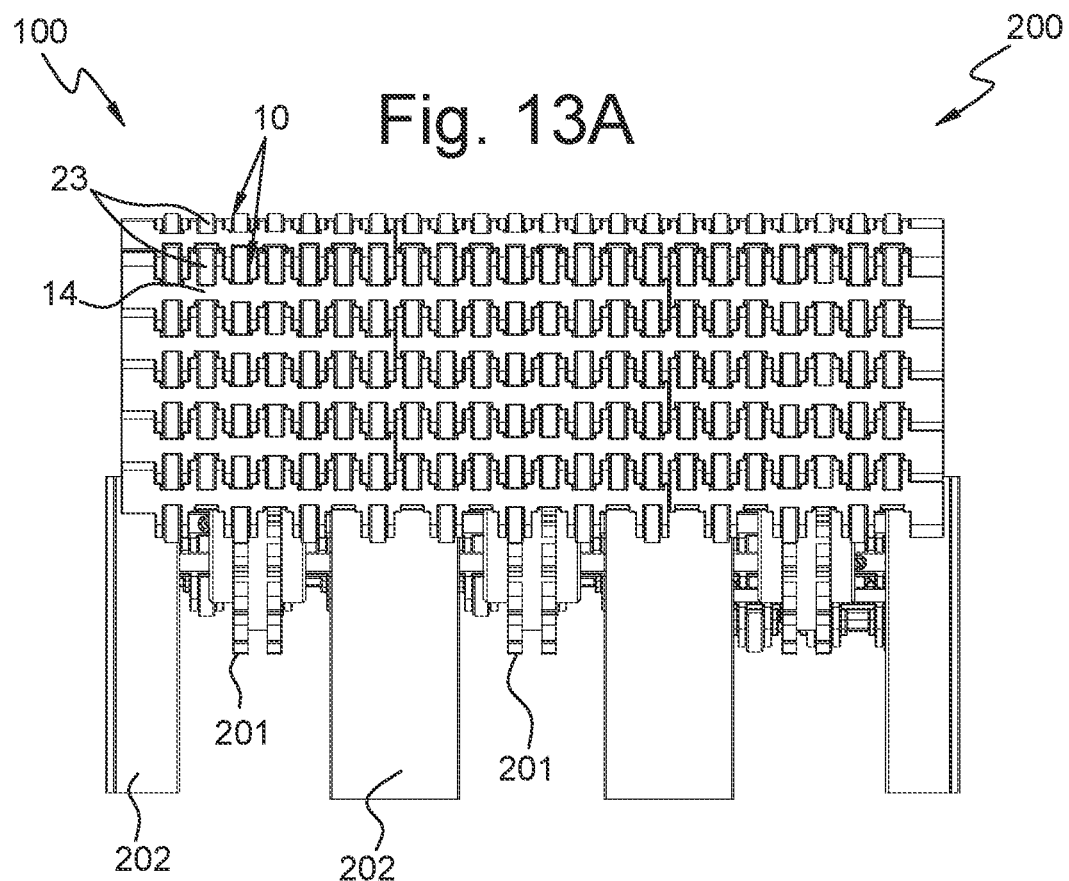
FIGS. 13A and 13B are top and bottom plan views respectively of FIG. 12.
Figure 13B:
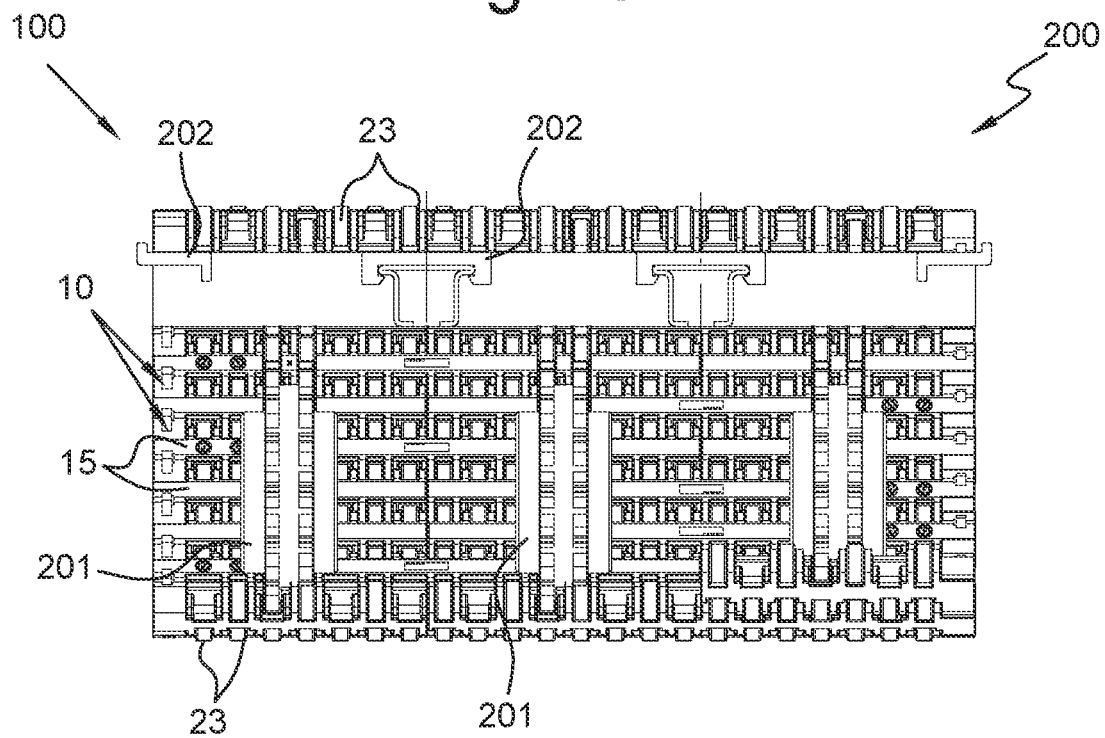
Figure 14:
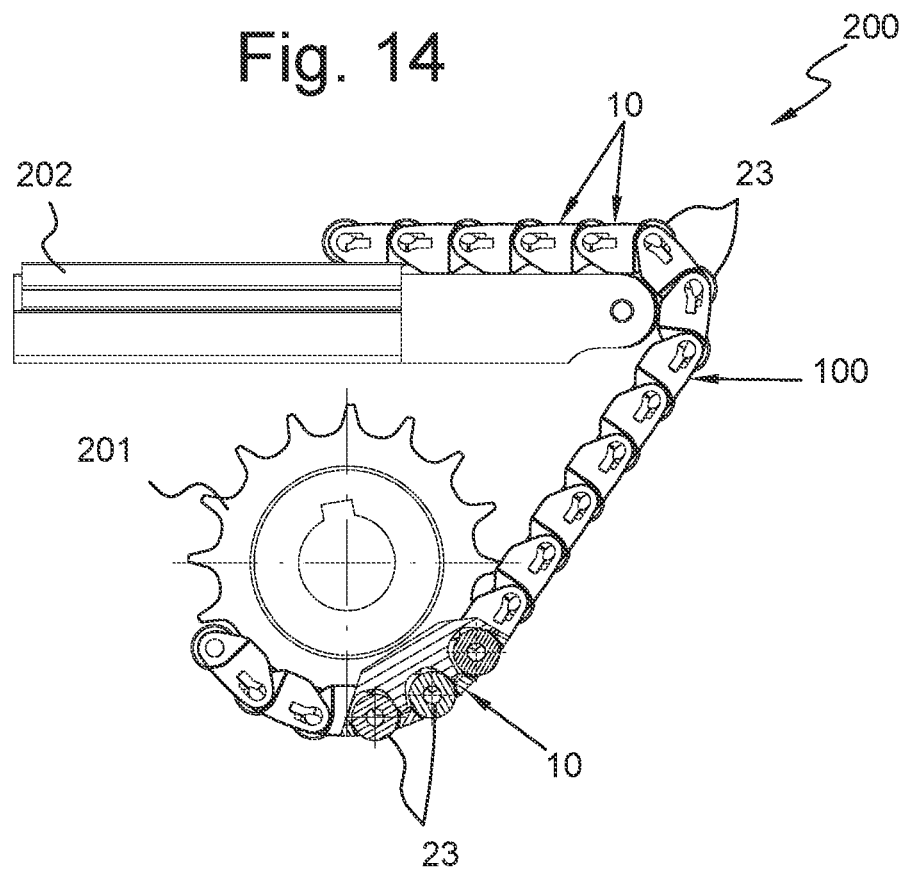
FIG. 14 is a side elevation and partially sectioned view of FIG. 12.

FIGS. 12 to 14 schematically and partially show a conveyor 200 comprising a belt 100 made with modules 10 according to the first embodiment according to the present disclosure, with the relative transmission gears 201 constituted by toothed wheels with two crowns of teeth and the slider tracks 202, of which the lateral ones also act as guides.

Figure 15:
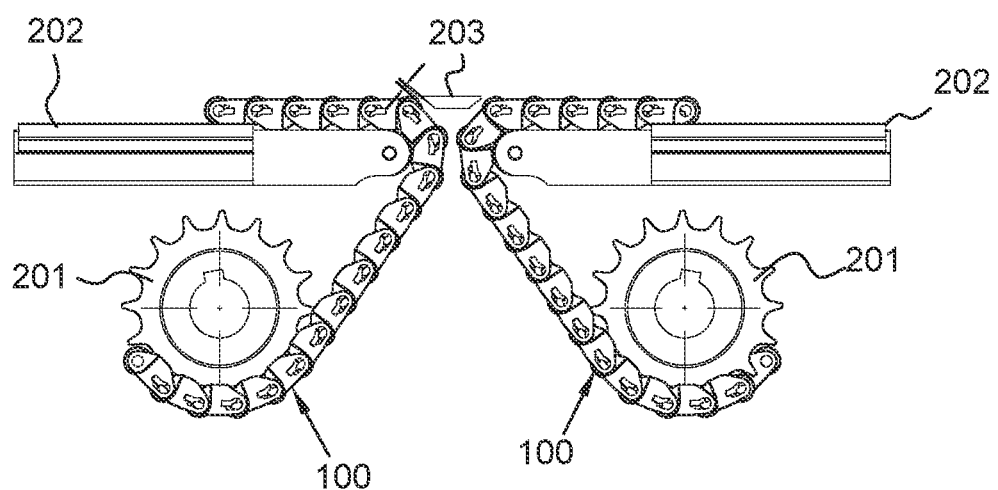
FIG. 15 is a side elevation view of the head tracts of two consecutive continuous motorized conveyors each comprising a modular conveyor belt according to a first possible embodiment of the present disclosure.
Figure 17:
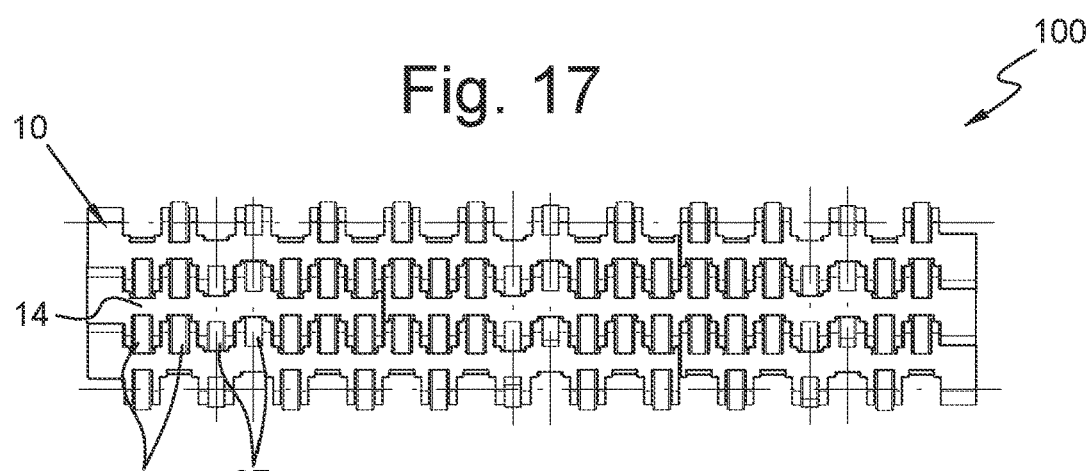
FIGS. 17, 18 and 19 are top plan, bottom plan and front views respectively of FIG. 16.
Figure 18:
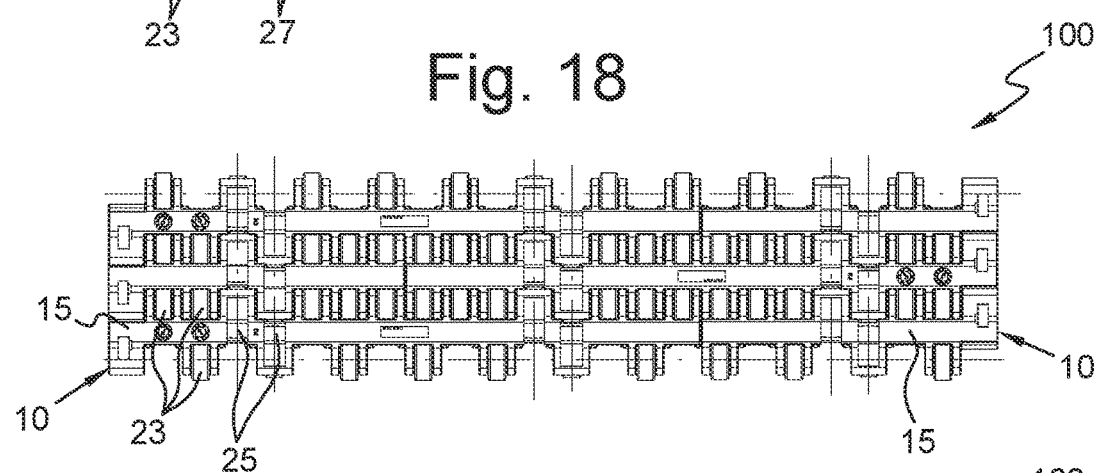
Figure 19:
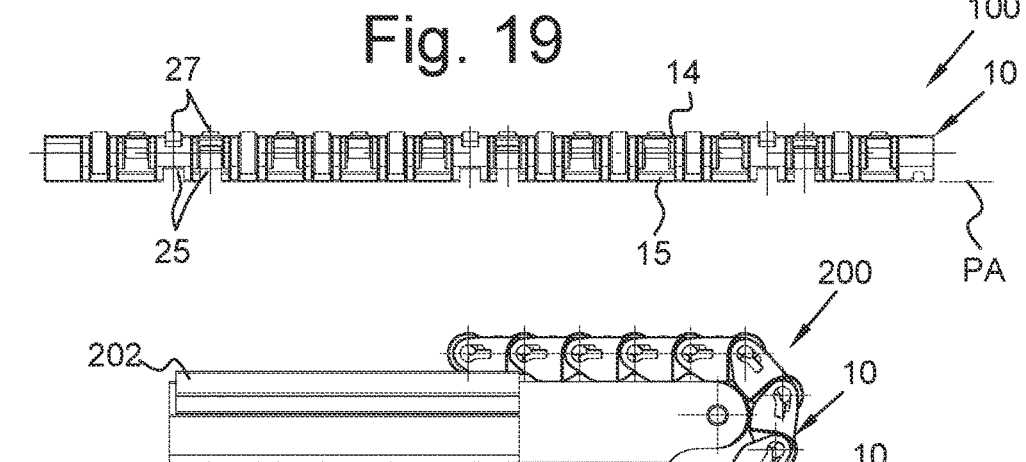
Figure 20:
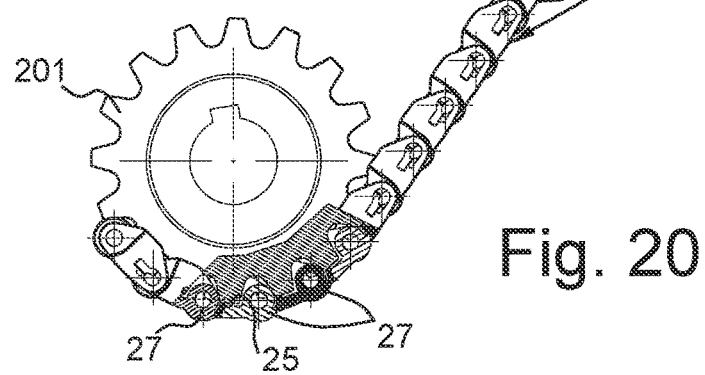
FIG. 20 is a side elevation view of a portion of a continuous motorized conveyor comprising a modular conveyor belt according to a second possible embodiment of the present disclosure.
Figure 21:
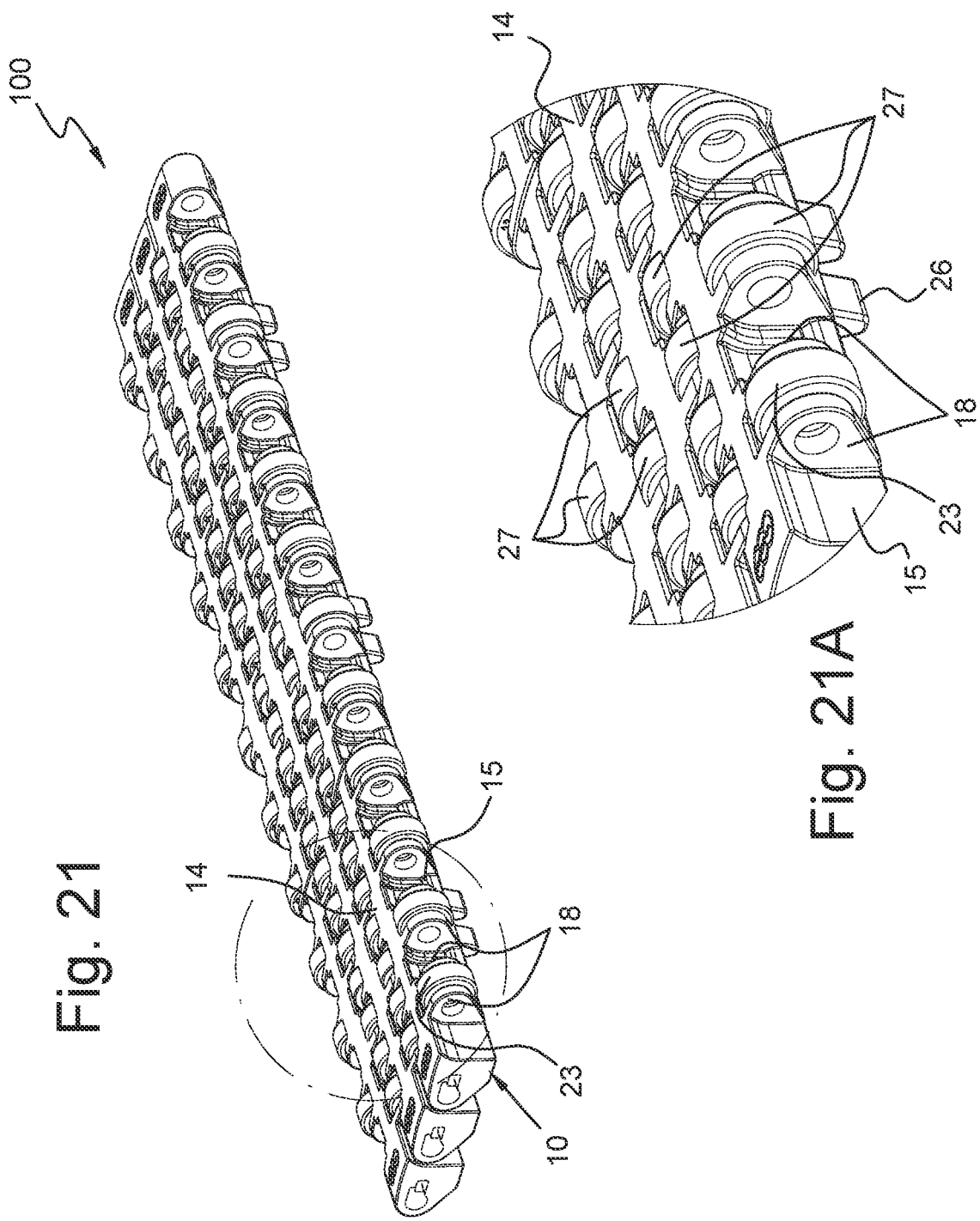
FIGS. 21 to 25 are views like those of FIGS. 16 to 20 of a portion of a modular conveyor belt according to a third possible embodiment of the present disclosure.
Figure 22:
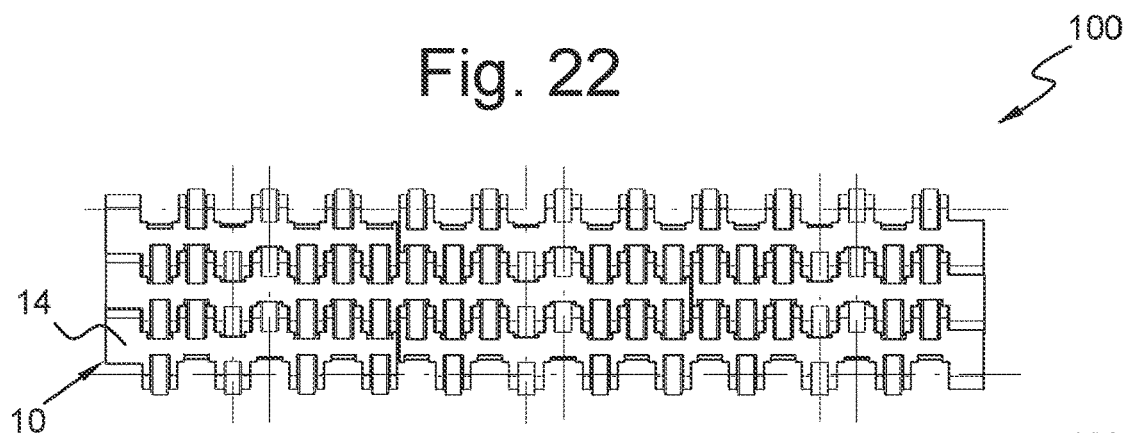
Figure 23:
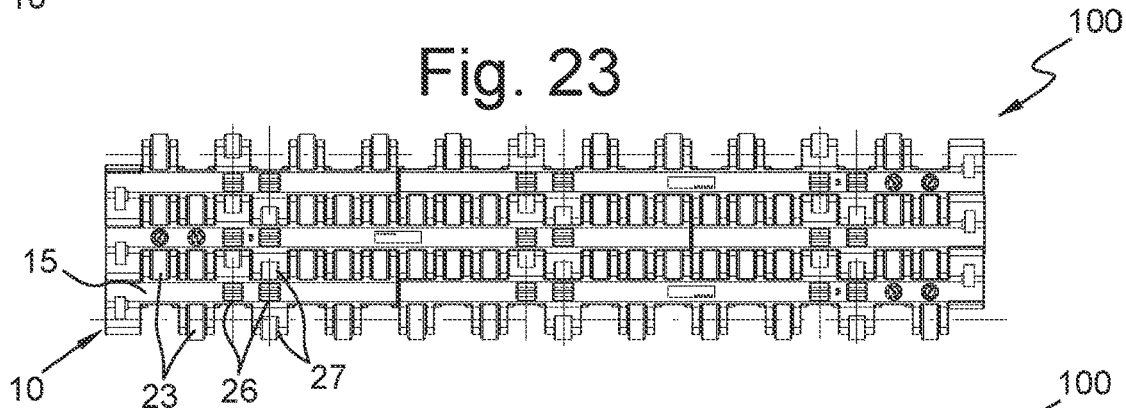
Figure 24:
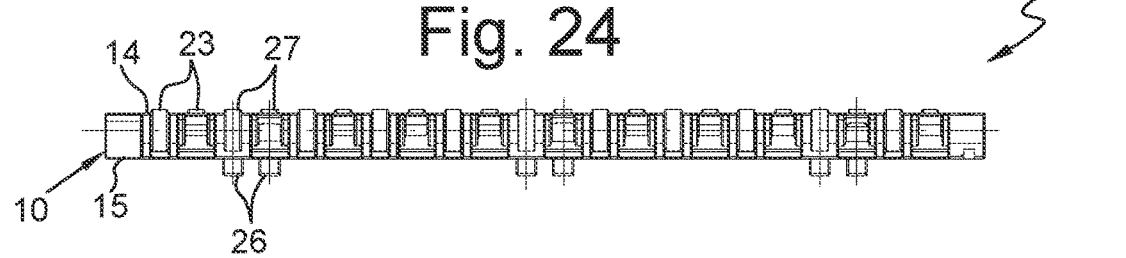
Figure 25:
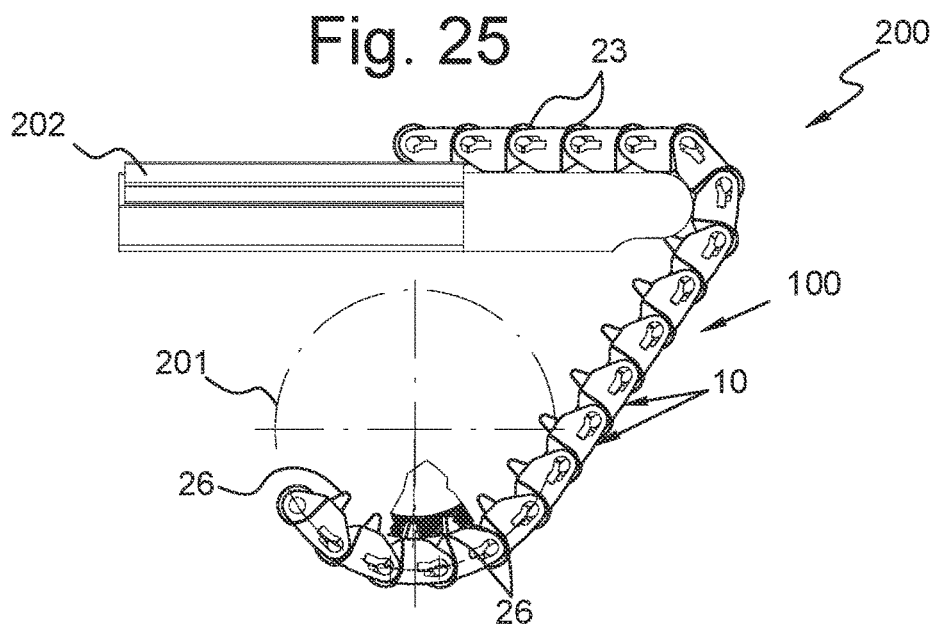

FIG. 15 shows the head passage between two successive conveyors 200 of the type shown in FIGS. 12 to 14. It should be noted that the opening in correspondence of the head passage between one conveyor and the next has a limited width—of the order of 20 mm 25 mm, specifically of about 24 mm—in correspondence with which it is possible, but not essential, arrange a fixed plate 203 without compromising the continuity and regularity of the transport of the products and respecting the safety regulations according to which the space that remains defined between the belt 100 being wound and the fixed plate 203 has a maximum width of less than 5 mm.

The second possible embodiment of the module 10 shown in FIGS. 16 to 20 differs from the first embodiment only in that the meshing elements are not constituted by rollers 23, but by recesses 25. In this case, in correspondence with the recesses 25, the spaces V are replaced or occupied by a respective fixed support 27.

The third possible embodiment of the module 10 shown in FIGS. 21 to 25 differs from the first embodiment in that the meshing elements are not constituted by rollers 23, but by gear teeth 26 which project below the lower surface 15. In this case, in correspondence of the gear teeth 26, the spaces V can be replaced or occupied by a respective fixed support 27, as an alternative to the rollers. In addition, the central rib 28 is devoid of the openings 280.

Compared to the first embodiment, the second and third embodiment as shown in the attached figures have a smaller "rolled" surface of contact with the products, the fixed supports 27, while restoring the continuity of the transport surface ST, could generate movements (rotations, misalignments) of the transported products partly resting on the fixed supports and partly resting on the rollers 23. Moreover, in the third embodiment, the position of the slider tracks 202 is constrained by the presence of the meshing teeth 26.

As mentioned above, the features according to which:
a) the rollers 23 constitute the meshing elements, and
b) the distance S between two successive spaces V or between two support elements (constituted by rollers 23 and possibly fixed supports 27)

may be adopted—singly or in combination between them—also independently of the feature according to which the support plane PA is arranged at a lower level than the plane tangent to the lower generatrix of the rollers 23 and also in combination with one or more of the remaining features of the module 10 as described above.

The third embodiment shown in FIGS. 26 to 28A shows precisely a belt obtained by linking modules 10' which integrate both of the aforementioned two features a) and b), but in which the support plane PA' is at a higher level than the tangent plane PT to the lower generatrix of the rollers 23'. The support plane PA' is spaced from the plane passing through the axes of the first and second holes of the hinge elements by a distance H1 lower than the radius R.

For simplicity's sake, in FIGS. 26 to 28A elements of the module 10' corresponding to those of the module 10 will be indicated by the same reference number indexed with "'".

In this case, the lower surface 15' of the base body 11' extends for at least a tract along a plane parallel with respect to the transport surface ST and which is spaced from the plane passing through the axes of the first and second holes by a distance H1 lower than the radius R of the rollers 23'.

This tract is defined in correspondence of each one of the first hinge elements 18' and of the second hinge elements 21' delimiting a corresponding space in which a respective roller 23' is received and realizing a support plane PA' suitable to rest in sliding contact on respective slider tracks 202'.

The support plane PA' also extends along each one of the first hinge elements 18' and of the second hinge elements 21' which delimit a corresponding space in which a respective roller 23' is received.

The slider tracks 202' are comb-shaped so as to work on the support plane PA' between two or more pairs of rollers 23' that are adjacent to each other in the belt 100'. The slider tracks 202' are comb-shaped so as to work on the support plane PA', preferably between each pair of rollers 23' that are adjacent to each other in the belt 100'.

As can be immediately understood from the attached figures, with the exception of the arrangement, the extension and the continuity of the support plane PA', the module 10' presents the structure and operation features described above with reference to the first embodiment. This refers, for example, to the conditions set in relation to the ratio P/D or to the ratio between the sum of the distance S and of transverse pitches L+S, or to the structure of the base body, to the arrangement of the first and second hinge elements and the rollers.

FIGS. 29 and 29A to 29B show a further alternative embodiment of a module 10 according to the present disclosure and which differs from that shown in FIGS. 1 to 15, solely in aspects of the shape of the base body 11.

In all the embodiments described and shown above, the base body 11 is made as a single body with the first and second hinge elements. It is, for example, made of plastic and obtained by moulding.

The assembly and the operation of the module and of the belt according to the present disclosure are immediately comprehensible to a person skilled in the art in light of the description provided above and the attached figures.

With regard to assembly, the rollers 23 may be arranged in the spaces V when assembling the belt 100 or may be supported by the base body of the module prior to assembly of the belt 100.

It has been found in practice that the module and the modular belt according to the present disclosure achieve the intended purposes.

The arrangement of the support plane PA at a lower level than the plane tangent to the lower generatrix rollers 23 makes it possible to:
arrange the slider tracks 202 in any position along the whole length of each module and then along the whole width of the belt, regardless of the position of the rollers;
make the position of the rollers independent of the position and size of the slider tracks 202;
reduce the wear of the module due to the sliding contact with the slider tracks 202, the width of which can be suitably dimensioned as it is not limited by the presence or absence of the rollers;
increase the "rolled" surface and thus the density of the rollers and the continuity of the rolled surface.

The use of rollers 23 as meshing elements makes it possible to:
increase the rolled surface and thus the density of the rollers and the continuity of the rolled surface,
also arrange the rollers in correspondence of the drive gears;
simplify the structure of the module itself.

The distribution of the spaces V or of the support elements, constituted at least in part by the rollers 23 and, where necessary and in limited number, by the fixed supports 27, in such a way that the maximum distance S (measured parallel to the first direction D1) between two successive spaces V or two support elements is different from zero and lower than or equal to 20 mm allows to:
achieve a high roller density;
ensure safe and smooth transport of the products.

It has been found in practice, for example, that with a module according to the present disclosure it is possible to obtain a rolled surface SR greater than 30%, the rolled surface being quantified by the value of the ratio of the total surface of the rollers to the surface of the belt:

$$SR = \left[\frac{L*n*D}{K*P}\right]*100$$

Where:
L=height of each roller [mm]
n=number of the rollers per each pitch
D=roller diameter [mm]
K=belt width [mm]
P=pitch [mm]

The belt according to the present disclosure also appears to comply with safety regulations in correspondence with the head passages.

The module of modular conveyor belt with roller transport surface and the modular conveyor belt thus conceived are susceptible to numerous modifications and variants, all of which are within the scope of the disclosure; furthermore, all details are replaceable by technically equivalent elements. In practice, the materials used, as well as the dimensions thereof, can be of any type according to the technical requirements.

The invention claimed is:

1. A module of modular conveyor belt with roller transport surface for continuous motorized conveyors comprising a base body extending in length along a first direction, said direction being transverse with respect to the transport direction, between two opposite lateral faces, the module comprising:

an upper surface and a lower surface,
a first longitudinal edge and a second longitudinal edge, opposed to each other with respect to a second direction orthogonal with respect to said first direction,
a plurality of first hinge elements and a plurality of second hinge elements projecting respectively from said first edge and from said second edge along said second direction, wherein each one of said first hinge elements is crossed by a respective first hole with axis parallel to said first direction and each one of said second hinge elements is crossed by a respective second hole with axis parallel to said first direction, said first holes being coaxial to each other to receive a respective hinge pin and said second holes being coaxial to each other to receive a respective hinge pin,
wherein said first hinge elements are configured for interposing the second hinge elements of another said module with the respective first holes and second holes coaxially aligned to each other to receive a hinge pin linking said modules to each other, said first hinge elements and said second hinge elements interposed to each other leaving free a plurality of spaces in at least some of which at least a respective roller is received, said roller having an outer radius and being coaxial with respect to said first holes and second holes aligned to each other,
wherein each one of said rollers projects with a portion from said upper surface, the plane parallel with respect to said first and second directions and tangent to said portion of said rollers projecting from said upper surface defining said transport surface,
and comprising
at least a meshing element configured to mesh with the teeth of drive gears of said continuous motorized conveyor,
wherein at least some of said rollers constitute said meshing elements.

2. The module according to claim 1, wherein said lower surface extends for at least a tract along a plane parallel with respect to said transport surface and spaced from the plane passing through the axes of said first holes and of said second holes by a distance lower than the outer radius of said rollers, said at least a tract of the lower surface being defined in correspondence of each one of said first hinge elements and of said second hinge elements and realizing a support plane configured to rest in sliding contact on respective slider tracks of said continuous motorized conveyor.

3. A module of modular conveyor belt with roller transport surface configured for continuous motorized conveyors comprising a base body extending in length along a first direction, said direction being transverse with respect to the transport direction, between two opposite lateral faces, the module comprising:
an upper surface and a lower surface,
a first longitudinal edge and a second longitudinal edge, opposed to each other with respect to a second direction orthogonal with respect to said first direction,
a plurality of first hinge elements and a plurality of second hinge elements projecting respectively from said first edge and from said second edge along said second direction, wherein each one of said first hinge elements is crossed by a respective first hole with axis parallel to said first direction and each one of said second hinge elements is crossed by a respective second hole with axis parallel to said first direction, said first holes being coaxial to each other configured to receive a respective hinge pin and said second holes being coaxial to each other configured to receive a respective hinge pin,
wherein said first hinge elements are configured for interposing the second hinge elements of another said module with the respective first holes and second holes coaxially aligned each other to receive a hinge pin linking said modules to each other, said first hinge elements and said second hinge elements interposed to each other leaving free a plurality of spaces in at least some of which at least a respective roller is received, said roller having an outer radius and being coaxial with respect to said first holes and second holes aligned to each other,
wherein each one of said rollers projects with a portion from said upper surface, the plane parallel with respect to said first and second directions and tangent to said portion of said rollers projecting from said upper surface defining said transport surface,
and comprising
at least a meshing element configured to mesh with the teeth of drive gears of said continuous motorized conveyor,
wherein said lower surface extends for at least a tract along a plane which is parallel with respect to said transport surface and which is spaced from the plane passing through the axes of said first holes and of said second holes by a distance higher than the outer radius of said rollers, said at least a tract of said lower surface forming a support plane configured to rest in sliding contact along slider tracks of said motorized continuous conveyor.

4. The module according to claim 3, wherein at least some of said rollers constitute said meshing elements.

5. The module according to claim 3, wherein said meshing elements are constituted by recesses at least partially obtained in said lower surface outside said support plane.

6. The module according to claim 3, wherein said meshing elements are constituted by meshing teeth which extend downwardly from said lower surface outside said support plane.

7. The module according to claim 3, wherein said support plane extends substantially continuously along said lower surface for the whole length of said base body, being interrupted only in correspondence of said meshing elements.

8. The module according to claim 3, wherein the difference between said distance and said outer radius is different from zero and lower than or equal to 5 mm (0 mm<(H-R)≤5 mm).

9. The module according to claim 3, wherein ratio of the pitch of said module and the diameter of each one of said rollers is between 1.1 and 3 (1.1≤P/D≤3), wherein said pitch is equal to the distance between axes of said first holes and of said second holes.

10. The module according to claim 3, wherein the distance between two of said spaces adjacent to each other measured along said first direction is different from zero and lower or equal to 20 mm (0 mm<S<20 mm).

11. The module according to claim 3, wherein the ratio between the sum of all said transverse distances between two adjacent spaces measured along said first direction and the sum of transverse pitches measured along said first direction is between 0.10 and 0.90.

12. The module according to claim 3, wherein each one of said rollers has a height measured along said first direction substantially equal to the width of the respective space wherein each one of said rollers is received.

13. The module according to claim 3, wherein said base body comprises a central rib extending in length between two opposed faces and in thickness between said upper surface and said lower surface, wherein said rib has a first longitudinal surface and a second longitudinal surface connecting said upper surface and said lower surface and defining respectively said first longitudinal edge and said second longitudinal edge, wherein said support plane extends substantially continuously along said lower surface for the whole length of said rib, being only interrupted in correspondence of said meshing elements.

14. The module according to claim 3, wherein:
said first hinge elements are distributed in pairs that are spaced one from the other along said first longitudinal edge, the first hinge elements of each one of said pairs being spaced to each other to define a respective space,
said second hinge elements are distributed in pairs that are spaced one from the other along said second longitudinal edge, the second hinge elements of each one of said pairs being spaced each other to define a respective space,
wherein said pairs of first hinge elements are offset with respect to said pairs of second hinge elements.

15. The module according to claim 14, wherein in each one of said spaces a respective at least one roller is received.

16. The module according to claim 14, wherein in each one of said spaces, is a respective at least one roller is received except that in correspondence with said meshing elements wherein said spaces are replaced or occupied by a fixed support whose external lateral surface is tangent to said plane defining said transport surface.

17. A modular conveyor belt comprising a plurality of modules according to claim 3 arranged adjacent to each other along said transport direction and linked to each other by said hinge pins forming a closed loop.

18. A continuous motorized conveyor comprising a conveyor belt according to claim 17 and further including at least a pair of driving gears about which it is wound said conveyor belt and meshing with said meshing elements.

* * * * *